United States Patent
Ikeda et al.

[11] Patent Number: 6,165,429
[45] Date of Patent: Dec. 26, 2000

[54] EXHAUST GAS PURIFYING CATALYST AND EXHAUST GAS PURIFYING METHOD

[75] Inventors: Yasuo Ikeda; Hirohito Hirata, both of Toyota, Japan

[73] Assignee: Toyota Jidosha Kabushiki Kaisha, Toyota, Japan

[21] Appl. No.: 08/986,206

[22] Filed: Dec. 5, 1997

[30] Foreign Application Priority Data

| Jan. 10, 1997 | [JP] | Japan | 9-002916 |
| Feb. 14, 1997 | [JP] | Japan | 9-030898 |
| Sep. 2, 1997 | [JP] | Japan | 9-237462 |

[51] Int. Cl.$^7$ .................................................. B01D 53/64
[52] U.S. Cl. ...................... 423/213.5; 502/326; 502/328; 502/330; 502/66; 502/64; 423/239.1; 423/239.2
[58] Field of Search ................... 502/64, 66, 326, 502/328, 330; 423/212, 213.2, 213.5, 239.1, 239.2, 213.7

[56] References Cited

U.S. PATENT DOCUMENTS

| 3,816,594 | 6/1974 | Kobylinski et al. | 423/213.5 |
| 3,931,050 | 1/1976 | Asano et al. | 252/462 |
| 4,012,485 | 3/1977 | Meguerian et al. | 423/213.5 |
| 4,492,769 | 1/1985 | Blanchard et al. | 502/262 |
| 4,492,770 | 1/1985 | Blanchard et al. | 502/304 |
| 4,675,308 | 6/1987 | Wan et al. | 423/213.5 |
| 5,130,109 | 7/1992 | Wan | 423/213.2 |
| 5,164,350 | 11/1992 | Abe et al. | 502/66 |
| 5,376,610 | 12/1994 | Takahata et al. | 423/213.7 |
| 5,459,119 | 10/1995 | Abe et al. | 502/326 |
| 5,643,542 | 7/1997 | Leyrer et al. | 423/212 |
| 5,700,747 | 12/1997 | Kyogoku et al. | 502/66 |
| 5,762,892 | 6/1998 | Kasahara | 423/213.5 |

FOREIGN PATENT DOCUMENTS

| 0 562 516 A1 | 9/1993 | European Pat. Off. |
| 0 661 089 A2 | 7/1995 | European Pat. Off. |
| 669157 | 8/1995 | European Pat. Off. |
| 0 657 204 A1 | 9/1995 | European Pat. Off. |
| 695580 | 2/1996 | European Pat. Off. |
| 0 716 876 A1 | 6/1996 | European Pat. Off. |
| 5-317652 | 12/1993 | Japan. |
| 95/35152 | 12/1995 | WIPO. |

Primary Examiner—Tom Dunn
Assistant Examiner—Peter DiMauro
Attorney, Agent, or Firm—Oliff & Berridge, PLC

[57] ABSTRACT

An exhaust gas purifying catalyst is formed of a first powder formed of porous particles supporting rhodium (Rh), and a second powder formed of porous particles supporting platinum (Pt) and a nitrogen oxides (NOX)-adsorbing material. The second powder and the first powder are present in a mixed state. In this catalyst, Rh is supported apart from Pt and the NOx adsorbent, so that reduction of the oxidizing performance of Pt is prevented, and so that the problems of poor compatibility between Rh and the NOx adsorbent is eliminated. The catalyst therefore maintains high NOx removing rate not only during an initial period but also after the endurance test.

13 Claims, 14 Drawing Sheets

EXHAUST GAS PURIFYING CATALYST AND EXHAUST GAS PURIFYING METHOD

BACKGROUND OF THE INVENTION

1. Field of the Invention

The present invention relates to an exhaust gas purifying catalyst and an exhaust gas purifying method for purifying exhaust gas from an internal combustion engine of a motor vehicle or the like and, more particularly, to an exhaust gas purifying catalyst and an exhaust gas purifying method capable of efficiently removing nitrogen oxides (NOx) by reduction, from exhaust gas that contains an amount of oxygen in excess of the amount of oxygen required for complete oxidation of the reducing components of the exhaust gas, such as carbon monoxide (CO), hydrogen gas ($H_2$), hydrocarbon (HC) and the like

2. Description of the Related Art

Many conventional motor vehicles employ three-way catalysts that purify exhaust gas by simultaneously oxidizing CO and HC and reducing NOx in exhaust gas at a theoretical air-fuel ratio (stoichiometric ratio). In a widely known three-way catalyst of this type, a heat-resistant base member formed of, for example, cordierite, carries thereon a porous support layer formed of τ-alumina, and the porous support layer supports catalytic noble metals such as platinum (Pt), rhodium (Rh) and the like.

Recently, carbon dioxide ($CO_2$) in exhaust gas from internal combustion engines of motor vehicles and the like has become and issue in view of protection of global environments. A promising technology for reducing the amount of $CO_2$ emission from an internal combustion engine is a lean burn system, in which combustion is performed at a lean air-fuel ratio with an excessive amount of oxygen. The lean burn system reduces fuel consumption due to improved fuel efficiency and, therefore, reduces the amount of $CO_2$ production by combustion.

Since the conventional three-way catalysts achieve simultaneous oxidation of CO and HC and reduction of NOx in exhaust gas when the air-fuel ratio is substantially the stoichiometric ratio, the conventional three-way catalysts fail to sufficiently remove NOx by reduction in lean-burnt exhaust gas, which contains an excessive amount of oxygen. Therefore, there has been a need for development of a catalyst and an exhaust gas purifying system capable of removing NOx even in an excessive-oxygen atmosphere.

The present applicant proposed in, for example, Japanese Patent Application Laid-Open No. Hei 5-317652, an exhaust gas purifying catalyst in which an alkaline earth metal, such as barium (Ba) or the like, and platinum (Pt) are supported by a porous support formed of alumina or the like. Using the exhaust gas purifying catalyst, NOx can be efficiently removed from lean-burnt exhaust gas from a lean burn system if the air-fuel ratio is controlled so that the air-fuel ratio shifts from a lean side to a stoichiometric/rich side in a pulsed manner. NOx is adsorbed by the alkaline earth metal (NOx adsorbent) on the lean side, and reacts with reducing components, such as HC, CO and the like, on the stoichiometric/rich side.

It has been found that the aforementioned NOx-removing process using the exhaust gas purifying catalyst proceeds in three steps: the first step in which NO in exhaust gas is oxidized into NOx; the second step in which NOx is adsorbed by the NOx adsorbent; and the third step in which NOx released from the NOx adsorbent is reduced on the catalyst.

However, in the conventional exhaust gas purifying catalysts, particle growth of platinum (Pt) occurs in a lean atmosphere, thereby reducing the number of catalytic reaction points. Therefore, the reactivity in the first and third steps inconveniently decrease.

Rhodium (Rh) is known as a catalytic noble metal that has a lesser tendency to undergo particle growth in a lean atmosphere. However, the oxidizing capacity of Rh is considerably lower than that of Pt. Use of a combination of Pt and Rh may be considered. It is known that co-presence of Pt and Rh reduces the particle grow of Pt.

With regard to combined use of Pt and Rh, it has been found that as the amount of Rh contained increases, the oxidizing capacity of Pt decreases, probably because Rh covers Pt surfaces. Therefore, as the Rh content increases, the reactivity of oxidation of NO into NOx in the first step decreases and the NOx-adsorbing rate in the second step also decreases. Another problem with Rh is low compatibility with NOx adsorbents. Co-presence of Rh and a NOx adsorbent results in insufficient performance of the NOx adsorbent and Rh.

In addition, sulfur (S) components contained in fuel are oxidized into $SO_2$, which is further oxidized on the catalyst into sulfates. If sulfates react with the NOx adsorbent, the NOx adsorbing capacity of the NOx adsorbent is lost, thereby impeding the removal of NOx by reduction. This undesired phenomenon is generally termed sulfur-poisoning of NOx adsorbent.

SUMMARY OF THE INVENTION

Accordingly, it is an object of the present invention to prevent a durability reduction due to the particle growth of platinum (Pt) by using rhodium (Rh) in addition to Pt and improve durability by preventing reduction of the NOx adsorbing and releasing performance of the NOx adsorbent.

According to one aspect of the invention, there is provided an exhaust gas purifying catalyst including a first powder formed of porous particles supporting rhodium, and a second powder formed of porous particles supporting platinum and a nitrogen oxides-adsorbing material. The second powder and the first powder are present in a mixed state.

At least one of the first powder and the second powder may support at least one element selected from the group consisting of cobalt, iron and nickel.

The second powder may support 1–10% by weight of rhodium relative to an amount of platinum.

A hydrocarbon-adsorbing adsorbent may be provided adjacent to the first powder.

The porous particles of the first powder may serve as the hydrocarbon-adsorbing adsorbent.

The HC-adsorbing adsorbent may exist at an interface between the first powder and the second powder.

The HC-adsorbing adsorbent may form a coating layer provided on a monolithic base member. At least the first powder is supported in the coating layer.

According to another aspect of the invention, there is provided an exhaust gas purifying catalyst including a base member, and a coating layer formed on a surface of the base member. The coating layer is formed of a first powder formed of porous particles supporting rhodium and a second powder formed of porous particles supporting a nitrogen oxides-adsorbing material. The first powder and the second powder are present in a mixed state. Platinum is supported in the coating layer. The concentration of platinum supported in a surface layer portion being higher than the concentration of platinum supported in an internal portion.

According to still another aspect of the invention, there is provided an exhaust gas purifying method. In a step of the method, a catalyst having a first powder and a second powder is disposed in an exhaust gas passage. The first powder is formed of porous particles supporting rhodium, and the second powder is formed of porous particles supporting platinum and a nitrogen oxides-adsorbing material. The first powder and the second powder are present in a mixed state. In another step, the nitrogen oxides-adsorbing material is allowed to adsorb nitrogen oxides in a lean atmosphere in which an excessive amount of oxygen is present. In still another step, the lean atmosphere is temporarily changed to a stoichiometric-rich atmosphere so as to cause reduction of nitrogen oxides released from the nitrogen-oxides-adsorbing material.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF THE INVENTION

Figure 1:
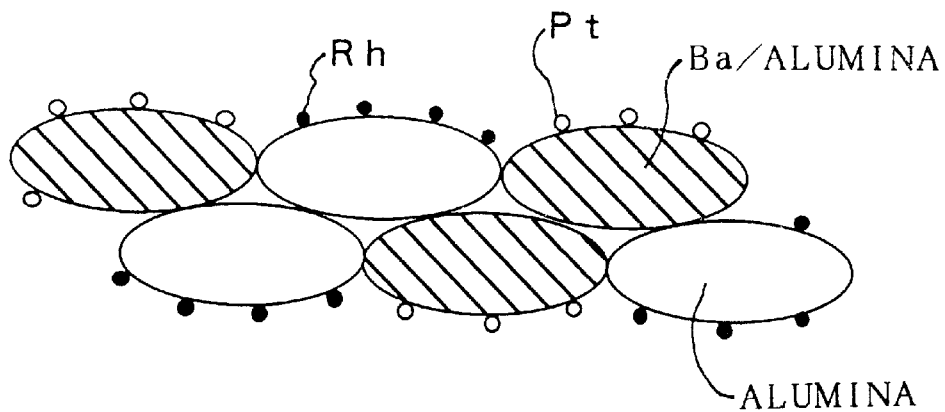
FIG. 1 is an illustration of the structure of an exhaust gas purifying catalyst of Example 1 of the invention.

In the exhaust gas purifying catalyst of the invention, rhodium (Rh) is present in the first powder, and platinum (Pt) and the nitrogen oxides adsorbing material (NOx adsorbent) are present in the second powder, and the first powder and the second powder are in a mixed state. That is, Pt and the NOx adsorbent are supported adjacent to each other, and Rh and Pt are supported apart from each other.

The particle growth of Rh in a lean atmosphere is remarkably less than that of Pt. Therefore, the presence of Rh improves durability. Furthermore, since Rh is supported apart from the NOx adsorbent, the problem of poor compatibility between the two components is eliminates, so that performance deterioration of the NOx adsorbent and Rh is prevented.

Furthermore, since Rh is separately supported, hydrogen, having a high reducing power, is produced from hydrocarbon (HC) and $H_2O$ in exhaust gas by Rh (water vapor reforming reaction). Hydrogen thus produced considerably contributes to the reduction of NOx and the desorption of sulfur oxides (SOx) from the NOx adsorbent which is subjected to sulfur-poisoning. Therefore, the reduction of NOx during rich pulses increases, and the sulfur-poisoning considerably decreases. Although the water vapor reforming activity of Rh is normally reduced by the presence of the NOx adsorbent, the exhaust gas purifying catalyst of the invention prevents this phenomenon and therefore allows water vapor reforming reaction by Rh to a maximum-possible level since Rh and the NOx adsorbent are supported apart from each other.

Therefore, if the exhaust gas purifying catalyst of the invention is actually exposed to a lean atmosphere (lean burnt exhaust gas) having an excessive amount of oxygen, nitrogen monoxide (NO) is oxidized into NOx on Pt in the second powder, and NOx is rapidly adsorbed by the NOx adsorbent supported adjacent to Pt. Since Rh is supported apart from Pt, the inhibition of oxidizing capacity of Pt by Rh is prevented, so that NO is efficiently converted into NOx. Furthermore, since Rh is also apart from the NOx adsorbent, the deterioration of NOx adsorbing activity is prevented.

HC and CO in exhaust gas react with oxygen present in an excessive amount by the catalytic reaction of Pt and Rh. Thus, HC and CO are readily removed by oxidation. In stoichiometric-rich atmospheres, NOx is released from the NOx adsorbent, and then reacts with HC and CO in exhaust gas by the catalytic reaction of Pt and Rh. Thus, NOx is removed by reduction into nitrogen gas ($N_2$).

The NOx reducing performance is improved by the hydrogen produced by the water vapor reforming reaction shown as formula (1). The reaction of the formula (1) occurs by the rhodium (Rh), and when a first powder formed of zirconia supporting rhodium (Rh) is utilized, the water vapor reforming reaction is further accelerated.

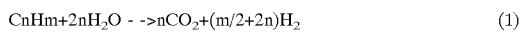

$$CnHm + 2nH_2O \rightarrow nCO_2 + (m/2 + 2n)H_2 \tag{1}$$

In the exhaust gas purifying catalyst of the invention, it is preferable that at least one of the first powder and the second powder carry at least one element selected from cobalt (Co), iron (Fe) and nickel (Ni). These elements accelerate aqueous gas shift reaction expressed in formula (2), thereby accelerating generation of hydrogen.

$$CO + H_2O \rightarrow CO_2 + H_2 \tag{2}$$

With its strong reducing power, hydrogen reduces NOx, so that the exhaust gas purifying catalyst maintains a high NOx reducing performance even after the endurance test.

Furthermore, hydrogen occurring in the vicinity of the NOx adsorbent reduces sulfates taken up by the NOx adsorbent, thereby reducing the degradation of the NOx adsorbent by sulfur-poisoning.

The amount of the at least one of Co, Fe and Ni supported in the exhaust gas purifying catalyst is preferably in the range of 0.01–2.0 moles relative to 120 g of the porous particles, whether a single element or two or more elements are selected. If the amount is less than 0.01 mole relative to 120 g, no substantial effect is achieved. If the amount is greater than 2.0 moles relative to 12.0 g no further improvement is achieved and the reaction of the catalytic noble metal may be reduced.

The at least one element selected from Co, Fe and Ni may be supported on either the porous particles of the first powder or the porous particles of the second powder, and may also be supported on the porous particles of both powders.

The porous particles carrying the at least one elements of Co, Fe and Ni may preferably support a promoter of at least one of silicon (Si) and magnesium (Mg). Provision of the promoter will further promote the hydrogen-producing reactions. The amount of the promoter supported on the porous particles is preferably within the range of 0.005–2.0 moles relative to 120 g of the porous particles. If the amount is less than 0.005 mole relative to 120 g, no substantial effect is achieved. If the amount is greater than 2.0 moles relative to 120 g, no further improvement is achieved. A particularly preferable range of the amount of the promoter is 0.01–0.5 mole relative to 120 g of the porous particles.

It is also preferable that the second powder carry 1–10% by weight of Rh relative to the amount of Pt. If a small amount of Rh is thus supported in the second powder, adjacent to Pt, the desirable effect of Rh, that is, reduction of Pt particles growth, becomes dominant over the undesired effect of Rh, that is, reduction of the oxidizing performance of Pt, thereby further improving durability. If the amount of Rh supported in the second powder is less than 1% by weight relative to the weight of Pt, no substantial effect of Rh is achieved. If the amount exceeds 10% by weight, the reduction of the oxidizing performance of Pt by Rh becomes significantly great, so that the aforementioned reaction in the first step of the NOx-removing process becomes slow. The NOx removing performance therefore decreases.

It is also preferred that Pt and Rh be present in the form of a solid solution in the second powder. It is speculated that if Pt and Rh forms a solid solution, the aforementioned desirable effect of Rh will more likely surpass the undesired effect of Rh.

Through closer investigation of the acting mechanism of the catalyst, it has become clear that in a rich atmosphere, reaction between water vapor and HC in exhaust gas is occurred on the first powder, producing hydrogen, which in turn contributes to the reduction of NOx.

That is, the water vapor reforming reaction with HC in exhaust gas occurs on the first powder, thereby producing hydrogen, which in turn reduces NOx released from the NOx adsorbent in a rich atmosphere. Therefore, the aforementioned reaction in the third step of the NOx-removing process is accelerated.

In some cases, sulfur-poisoning of NOx adsorbent occurs, wherein SOx in exhaust gas react with the NOx adsorbent to produce sulfuric acid salts whereby the NOx adsorbing capacity is lost. However, due to the production of hydrogen, SOx in exhaust gas is reduced so that the sulfur-poisoning is considerably prevented. Furthermore, the sulfur-poisoned NOx adsorbent is also reduced by hydrogen, so that the NOx adsorbing capacity is recovered. Therefore, high NOx adsorbing capacity of the NOx adsorbent is maintained, so that the reaction in the third step is accelerated.

The reaction between water vapor and HC, that is, a hydrogen-producing reaction, hardly occurs in a lean atmosphere containing an excessive amount of oxygen because there is almost no HC left in the lean burnt exhaust gas. In a lean atmosphere, oxygen present in an excessive amount oxidizes almost the entire amount of HC into $H_2O$ and $CO_2$. If a little amount of hydrogen is produced, hydrogen immediately reacts with oxygen present in an excessive amount to produced $H_2O$. Therefore, the aforementioned hydrogen-producing reactions are not fully enjoyed in purifying exhaust gas from a system, such as a lean burn engine, wherein lean atmospheres occur in most operating conditions.

Therefore, it is preferred that a HC-adsorbing adsorbent be provided adjacent to the first powder. Thereby, a large amount of HC present in a rich atmosphere is adsorbed to the HC-adsorbing adsorbent. In a lean atmosphere, HC is released from the HC-adsorbing adsorbent, so that HC reacts with water vapor on the first powder, by reaction of Rh, to produce hydrogen.

Thus, provision of the HC-adsorbing adsorbent enables production of hydrogen even in a lean atmosphere, so that NOx is reduced, thereby improving the NOx removing performance. Furthermore, sulfur-poisoned NOx adsorbent and, further, SOx are also reduced by hydrogen, so that the sulfur-poisoning of the NOx adsorbentis eliminated and the NOx adsorbing capacity is recovered. In addition, further sulfur-poisoning is prevented. Therefore, the NOx removing performance is significantly improved.

A representative examples of the HC-adsorbing adsorbent is zeolite. There are various types of zeolites, such as Y type, A type, X type, ZSM-5, silicalite, mordenite, ferrierite, and the like. All of these types have high HC-adsorbing capacity.

Among them, Y-type zeolite, ZSM-5, silicalite and mordenite have particularly high HC-adsorbing capacity. Therefore, it is preferred to use a zeolite selected from those zeolites.

To increase the hydrogen production rate by increasing the rate of reaction between HC and water vapor, it is necessary that the HC-adsorbing adsorbent, which supplies HC in lean atmospheres, be adjacent to the first powder, which offers reaction active points for the reaction between HC and water vapor.

This requirement may be achieved by employing first powder in which porous particles are served as a HC-adsorbing adsorbent. Such first powder can be formed by, for example, supporting or fixing at least Rh on porous particles formed of zeolite. The thus-produced first powder will adsorb HC in rich atmospheres, and releases HC in lean atmospheres, which immediately reacts with water vapor on the first powder. Therefore, the reaction between HC and water vapor readily occurs on the first powder to produce hydrogen not only in rich atmospheres but also in lean atmospheres.

The aforementioned requirement may also be achieved by disposing a HC adsorbent at an interface between the first powder and the second powder. For example, a HC-adsorbing adsorbent in the form of particles is mixed with the first powder and the second powder, to form a catalyst. In this manner, the HC-adsorbing adsorbent is disposed at the interface between the first powder and the second powder, so that HC is adsorbed to the HC-adsorbing adsorbent in rich atmospheres, and is released therefrom in lean atmospheres to immediately react with water vapor on the first powder to produce hydrogen.

In still another possible manner, a HC-adsorbing adsorbent-formed coating layer is provided on a monolithic base member, the first powder is supported onto the coating layer. In some cases, such a coating layer may be formed from the first powder and HC-adsorbing adsorbent powder. In the thus-produced catalyst, HC is adsorbed to the coating layer in rich atmospheres, and is released therefrom in lean atmospheres and reacts with water vapor on the first powder. Therefore, the reaction between HC and water vapor readily occurs on the first powder to produce hydrogen not only in rich atmospheres but also in lean atmospheres.

In an example method for producing an exhaust gas purifying catalyst containing such a HC-adsorbing adsorbent, the first powder is prepared by supporting or fixing Rh onto a HC-absorbing adsorbent powder. The first powder is mixed with the second powder and the mixture is formed into pellets, thereby producing a desired catalyst in the form of pellets. In another example method, a monolithic base or a honeycomb base formed of a metal foil is coated with a slurry containing a mixture of the first and second powders as a main component, and the coated base is baked, thereby producing a desired catalyst.

Furthermore, a mixture of the first powder containing no such HC-adsorbing adsorbent, the second powder and a HC-adsorbing adsorbent powder, may be formed into pellets or a coating layer.

Further, after a monolithic base is coated with a HC-adsorbing adsorbent, a mixture of the first powder and the second powder may be supported on the coating layer. To support the first powder and second powder on the HC adsorbent, various methods may be employed, for example: a deposition method in which zeolite is suspended in an aqueous solution of a zirconium salt or an aluminum salt, and an alkali is added to shift the pH to a base side so that precipitation occurs on the zeolite; a sol-gel method in which an alkoxide of zirconium or aluminum is hydrolyzed so that the hydroxide of zirconium or aluminum is supported on zeolite, and the like Normally, exhaust gas purifying catalysts are provided in the form of a honeycomb, wherein a cordierite or metal-made honeycomb base is coated with a support material, such as alumina, and the coating layer supports a catalytic metal or a NOx adsorbent.

A conventional mainstream method for supporting a noble metal in a catalyst is an adsorption-support method in which a base having a coating layer is dipped into an aqueous solution of a noble metal compound, and then pulled up, dried and baked. In the adsorption-support method, noble metal ions in the aqueous solution are fixed in a surface portion of the coating layer, so that substantially no noble metal ions are contained in the aqueous solution that penetrates into an interior portion. Therefore, noble metal is supported only in a surface layer of the coating layer. This is favorable in view of catalytic reactions.

However, in the above-described catalyst wherein Rh and the NOx adsorbent are supported apart from each other, the noble metal and the NOx adsorbent are each supported on powder, and the powder is applied as a coating onto a base to form a desired catalyst. Therefore, the noble metal in this separate-support catalyst is supported uniformly in the entire coating layer. Since noble metal supported in an interior portion of the coating layer may not be fully used, it is desirable to provide a measure for more effective use of noble metal supported in the separate-support catalyst.

Therefore, in an exhaust gas purifying catalyst including a base member, a coating layer formed on a surface of the base member, and Rh, Pt and an NOx adsorbent that are supported in the coating layer, it is preferred that the coating layer be formed of a mixture of a first powder formed of porous particles carrying Rh and a second powder formed of porous particles carrying Pt and the NOx adsorbent, and that the concentration of Pt supported in a surface portion of the coating layer be higher than that in an interior portion of the coating layer.

With the concentration of Pt supported in a surface portion being higher than that in an interior portion, the probability of contact between Pt and exhaust gas components increases, so that reaction efficiency increases and, therefore, the exhaust gas purifying performance further improved.

More specifically, in a lean atmosphere, NO approaches a surface of the catalyst, and becomes oxidized by Pt present in a surface layer into NOx, and enters an interior portion of the catalyst, where it is adsorbed by the NOx adsorbent. At the time of a rich pulse, hydrogen is produced by the water vapor reforming reaction with Rh, and NOx is released from the NOx adsorbent. When NOx passes through the surface layer toward the surface, NOx reacts with hydrogen by the catalytic reaction of Pt. Thus, NOx is reduced to $N_2$, and $N_2$ is discharged. Therefore, the efficiency of using HC at the time of rich pulses further improves, and the NOx removing performance further improves. Although SOx may strongly bind with the NOx adsorbent, such SOx is released by reduction with hydrogen, so that the NOx adsorbent regains the original NOx adsorbing capacity. Therefore, the NOx removing performance further improves.

The amount of Pt supported in a surface portion of the coating layer is preferably in the range of 0.1–10 g and, more preferably, in the range of 0.1–2 g, relative to 120 g of the porous particles in the entire catalyst. If the amount of Pt is less than 0.1 g relative to 120 g of the porous particles, no substantial effect of a higher Pt concentration in the surface portion is achieved. If the amount of Pt is higher than 2 g, no further significant improvement of the effect may not be achieved and, in some cases, a cost problem may result.

The amount of Pt supported in the entire catalyst may be approximately equal to the amount of Pt supported in conventional catalysts, thereby preventing a considerable cost increase. For example, the amounts of Pt supported in the second powder and the surface layer may be in the range of 0.1–10 g in total relative to 120 g of the porous particles in the entire catalyst, and may be varied within the range of 0–10 g, respectively.

Rh may be supported not only in the first powder but also in a surface layer of the coating layer. In this case, the amount of Rh supported in the surface layer is preferably not more than 10% relative to the weight of Pt supported in the surface layer. If the amount of Rh in the surface layer exceed 10%, the oxidizing performance of Pt supported in a higher concentration in the surface layer decreases, so that the NOx removing performance decreases.

The NOx adsorbent may also be supported in a surface layer of the coating layer. In this case, the NOx adsorbent is preferably an alkali metal achieving a high NOx adsorbing capacity in a small amount. The amount of the NOx adsorbent in the surface layer is preferably in the range of 0–5 moles and, more preferably, in the range of 0.1–0.5 mole, relative to 120 g of the porous particles in the entire catalyst. If the amount of the NOx adsorbent in the surface layer is excessively large, the exhaust gas purifying performance of the precious metal may significantly decreases.

To produce an exhaust gas purifying catalyst as described above, the first powder carrying Rh and the second powder carrying Pt and the NOx adsorbent are mixed, and slurry containing the mixture as a main component is applied as a coating onto a cordierite or metal foil-made honeycomb base. The coated honeycomb base is baked, thereby forming coating layers. The baked honeycomb base is dipped into and pulled up from an aqueous solution containing at least Pt, and then dried and baked, thereby producing a desired catalyst.

When the aqueous solution containing Pt contacts the coating layer, Pt ions in the solution adsorbs mainly to a surface layer of the coating layer, and substantially no Pt ion remains in the solution penetrating into an interior portion. Therefore, Pt is supported in the surface layer in a concentrated manner, so that the concentration of Pt supported in the surface layer becomes higher than that in the interior portion.

In the exhaust gas purifying catalyst of the invention, HC and Co are oxidized on Pt in lean atmospheres containing excessive amounts of oxygen. Simultaneously, there occur the first step wherein NO is exhaust gas is oxidized into NOx and the second step wherein NOx is adsorbed by the NOx adsorbent. Since Pt and the NOx adsorbent are supported adjacent to each other and Rh is supported apart from Pt, the problem of a reduction in the oxidizing performance of Pt due to the presence of Rh is proximity does not arise. Therefore, the first and second steps smoothly proceed.

Upon a temporary change to a stoichiometric-rich atmosphere, NOx is released from the NOx adsorbent and reacts with HC and CO in exhaust gas by the catalytic reactions of Pt and Rh. NOx, and HC and CO are thus removed by reduction and oxidation.

In the exhaust gas purifying catalyst of the invention, NO is oxidized into $NO_2$ on Pt in the second powder, and NOx is rapidly adsorbed by the NOx adsorbent supported adjacent to Pt, in a lean atmosphere containing an excessive amount of oxygen. Since Pt and Rh are supported apart from each other, inhibition of the oxidizing performance of Pt by Rh is prevented and, therefore, NO is smoothly converted into $NO_2$. Furthermore, since the NOx adsorbent is supported apart from Rh, the deterioration of the NOx removing performance is prevented. Therefore, NOx is smoothly adsorbed by the NOx adsorbent and thereby prevented from being released to outside. HC and CO in exhaust gas react with oxygen present in an excessive amount by catalytic reactions of Pt and Rh. HC and CO are thus readily removed oxidation.

When the atmosphere is changed to a stoichiometric-rich atmosphere, NOx is released from the NOx adsorbent, and reacts with HC and CO in the exhaust gas by the catalytic reactions of Pt and Rh and, in addition, reacts with hydrogen produced on the second powder, thereby turning into $N_2$. Thus, NOx is removed by reduction. Even if Pt particle growth occurs so that the reducing power decreases, the great reducing power of Rh still efficiently removes NOx by reduction.

HC in exhaust gas adsorbs to and accumulates on the HC-adsorbing adsorbent in a stoichiometric-rich atmosphere. When the atmosphere becomes a lean atmosphere containing an excessive amount of oxygen, HC is released from the HC-adsorbing adsorbent, and reacts with water vapor to produce hydrogen, which in turn reduces NOx and, further, reduces the sulfur-poisoned NOx adsorbent. Therefore, the NOx adsorbing capacity is recovered. Since SOx is reduced by hydrogen, further sulfur-poisoning of the NOx adsorbent is prevented.

Therefore, the exhaust gas purifying catalyst of the invention is able to produce hydrogen not only in rich atmospheres but also in lean atmospheres, thereby considerably improving the NOx removing performance.

The porous particles, whether for the first powder or the second powder, may be selected from alumina, silica, titania, zirconia, silica-alumina, zeolite and the like. Any one or more of these materials may be selected. If more than one materials are selected, they may be used in a mixture or a composite form. In view of heat resistance, and the good compatibility of zirconia with Rh, it is preferred that zirconia is used for the first powder and alumina is used for the second powder. If zirconia is used for the first powder, the water vapor reforming reaction of Rh remarkably improves.

The particle diameter of the porous particles of the first and second powders is preferably within the range of 1–100 $\mu$m. If the particle diameter is smaller than 1 $\mu$m, it becomes difficult to achieve the effect of the separate supporting of Rh and Pt. If the particle diameter is larger than 100 $\mu$m, the interreaction between the first powder and the second powder is inconveniently reduced.

The amount of Rh supported in the first powder is preferably within the range of 0.05–20 g relative to 120 g of the porous particles. If the amount of Rh supported is less than 0.05 g relative to 120 g of the porous particles, the durability deteriorates. If it is more than 20 g relative to 120 g, no further improvement of the effect is achieved and a cost increase may result. A particularly preferred range of the amount of Rh supported in the first powder is 0.1–10 g relative to 120 g of the porous particles. It is also possible to support palladium (Pd), iridium (Ir) or the like in the first powder, in addition to Rh. The amount of such material may be determined such that the total amount, including the amount of Rh, is within the aforementioned range.

The amount of Pt supported in the second powder is preferably within the range of 0.1–10 g relative to 120 g of the porous particles. If the amount of Pt supported is less than 0.1 g relative to 120 g of the porous particles, the removing rates for HC, CO and NOx decrease. If it is more than 10 g relative to 120 g, no further improvement of the effect is achieved and a cost increase may result. It is also possible to support Pd in the second powder, in addition to Pt. Preferably, the amount of Pd is determined such that the total amount of Pt and Pd is within the range of 0.1–10 g relative to 120 g of the porous particles.

The NOx adsorbent may be formed of at least one element selected from alkaline metals, alkaline earth metals and rare earth metals. Examples of the alkali metals include lithium (Li), sodium (Na), potassium (K), cesium (Cs), and the like. The alkaline earth metals refer to elements of the 2A family according to the periodic table. Examples of the alkaline earth metals include magnesium (Mg), calcium (Ca), strontium (Sr), barium (Ba), and the like. Examples of the rare earth metals include lanthanum (La), cerium (Ce), praseodymium (Pr), and the like.

The amount of the NOx adsorbent supported in the second powder is preferably within the range of 0.05–3 moles relative to 120 g of the porous particles. If the amount of the NOx adsorbent in the second powder is less than 0.05 mole relative to 120 g of the porous particles, the NOx removing rate decreases. If the amount if more than 3 moles relative to 120 g of the porous particles, no further improvement is achieved. A particularly preferred range of the amount of the NOx adsorbent in the second powder is 0.05–0.5 mole relative to 120 g of the porous particles.

The mixing ratio between the first powder and the second powder is preferably within the range of first powder: second powder =0.05:1 to 1:1, on the basis of weight ratio between Rh and Pt or the total weight of Pt and Pd. If alumina is used as the porous particles of both the first powder and the second powder, the mixing ratio is preferably within the range of first powder: second powder=0.1:1 to 2:1, on an alumina weight ratio basis. If the mixing ratio is outside these ranges, there may occur problems similar to those caused by inappropriate amounts of Rh and Pt.

To form an exhaust gas purifying catalyst from a mixture of the first powder and the second powder, the mixture may be formed into pellets by a standard method, thereby producing a catalyst in the form of pellets. Furthermore, a slurry containing a mixture of the first and second powders as a main component may be applied as a coating onto a cordierite or metal foil-formed honeycomb base, which is then baked to produce a monolithic catalyst.

In the exhaust gas purifying method of the invention, HC and CO are removed by oxidation on Pt in the second powder in a lean atmosphere containing an excessive amount of oxygen. Simultaneously, NO is oxidized into NOx, which is rapidly adsorbed by the NOx adsorbent supported adjacent to Pt. Since Pt is supported apart from Rh, inhibition of the oxidizing performance of Pt by Rh is prevented and, therefore, NO is smoothly converted into NOx. Furthermore, since the NOx adsorbent is supported apart from Rh, the deterioration of the NOx removing performance is prevented. Therefore, NOx is smoothly adsorbed by the NOx adsorbent and thereby prevented from being released to outside. HC and CO in exhaust gas react with oxygen present in an excessive amount by catalytic reaction of Pt and Rh. HC and CO are thus readily removed by oxidation.

When the atmosphere is temporarily changed to a stoichiometric-rich atmosphere, NOx is released from the NOx adsorbent, and reacts with HC and CO in the exhaust gas by the catalytic reactions of Pt and Rh and, in addition, reacts with hydrogen produced through the reactions of formulas (1) and (2), which are accelerated by at least one element selected from Co, Fe and Ni. NOx is thereby reduced into $N_2$. Even if Pt particle growth occurs so that the reducing power decreases, the great reducing power of Rh still efficiently removes NOx by reduction.

EXAMPLES

The invention will be further described in detail with reference to Examples and Comparative Examples, and the accompanying drawings.

(1) Examples of First Series

EXAMPLES 1

Preparation of First Powder

Alumina powder having an average particle diameter of 5 μm was impregnated with a predetermined amount of rhodium nitrate aqueous solution of a predetermined concentration, and then dried at 100° C. for 3 hours, and baked at 250° C. for 2 hours, thereby supporting Rh in the alumina powder. As for the amount of Rh supported, four different levels were selected, that is, 0.1 g, 0.5 g, 1.0 g, and 2.0 g relative to 120 g of the alumina powder. Thus, four types of the first powders were prepared.

Preparation of Second Powder

Alumina powder having an average particle diameter of 5 μm was impregnated with a predetermined amount of a barium acetate aqueous solution of a predetermined concentration, and then dried at 100° C. for 3 hours, and baked at 500° C. for 2 hours, thereby supporting Ba in the alumina powder. The amount of Ba supported was 0.4 mole relative to 120 g of the alumina powder.

Subsequently, the thus-obtained Ba-carrying alumina powder was impregnated with a 15-g/L ammonium bicarbonate aqueous solution, and then dried at 100° C. for 3 hours. Thereby, Ba was converted into barium carbonate and supported uniformly in the alumina powder.

The Ba/alumina powder was impregnated with a predetermined amount of a dinitrodiammine platinum nitrate aqueous solution of a predetermined concentration, and dried at 100° C. for 3 hours, and then dried at 250° C. for 2 hours, thereby supporting Pt in the powder. The amount of Pt supported was 2.0 g relative to 120 g of the alumina powder. The second powder was thus prepared.

Preparation of Catalyst

Equal amounts of the first powder and the second powder by weight ratio were uniformly mixed, and then formed into pellets by a standard method, thereby four types of pellet catalysts were prepared. The structure of the pellet catalysts is schematically shown in FIG. 1.

Evaluation Test

Figure 2:
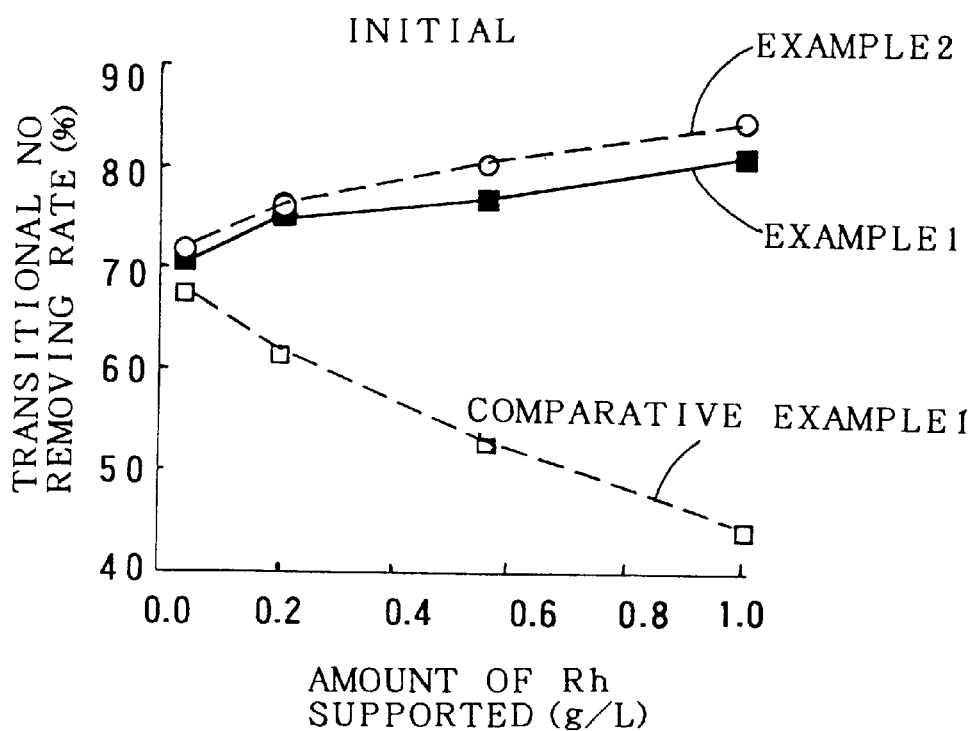
FIG. 2 is a graph indicating the relationship between the amount of Rh supported and the NO removing rate during an initial period.

The obtained pellet catalyst of each type was disposed in an evaluation test device, and model gases described in Table 1 were passed through. More specifically, a rich model gas and a lean model gas were alternately allowed to flow at an in-coming gas temperature of 350° C., at a flow rate of 2 L/min for two minutes respectively. The transitional NO removing rate of each catalyst was determined from the difference between the NO concentration in the gas coming in to the catalyst and the NO concentration in the gas going out from the catalyst. Results are indicated in FIG. 2.

TABLE 1

| Atmosphere | $O_2$ | NO | $C_8H_6$ | CO | $H_2$ | He |
|---|---|---|---|---|---|---|
| Rich | 0.25% | — | 710 ppm | 1.06% | 0.25% | balance |
| Lean | 7.9% | 570 ppm | 1200 ppm | 0.19% | 0.05% | balance |

Figure 3:
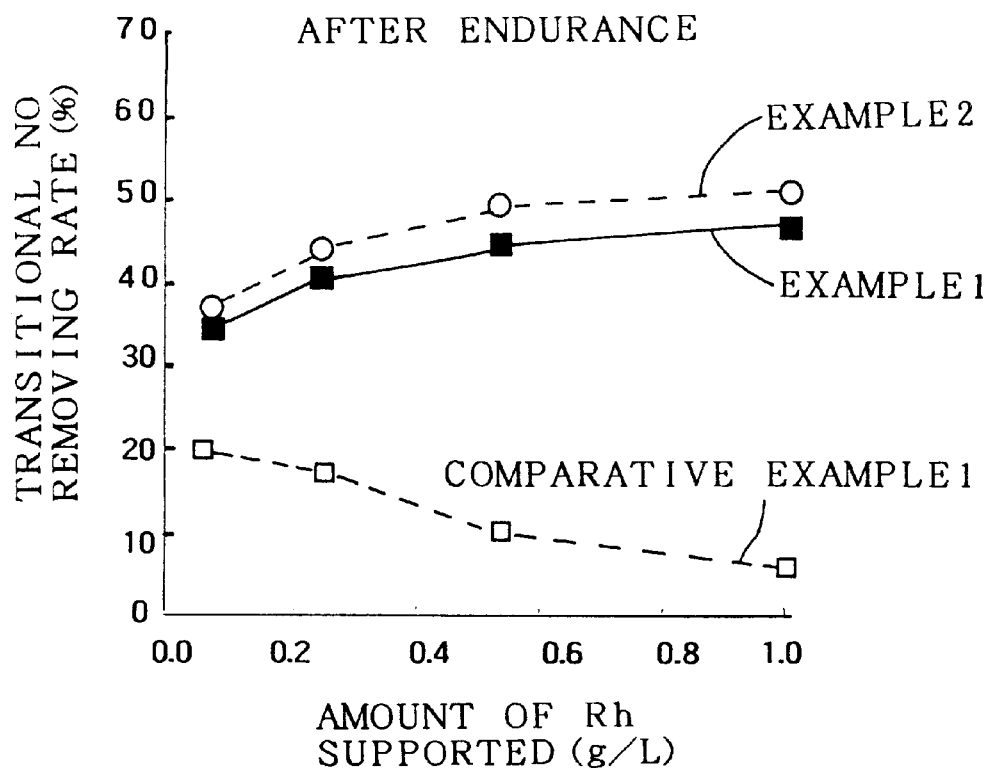
FIG. 3 is a graph indicating the relationship between the amount of Rh supported and the NO removing rate after the endurance test.

Endurance test was performed by allowing endurance rich and lean model gases shown in Table 2 to flow for 10 hours at an in-coming gas temperature of 800° C. while switching between the two gases in a pattern of 1 minutes for the rich gas and 4 minutes for the lean gas. After, that, the transitional NO removing rates were determined in the manner described above. Results are indicated in FIG. 3.

TABLE 2

| Atmosphere | $O_2$ | NO | $C_8H_6$ | CO | $H_2$ | $H_2O$ | He |
|---|---|---|---|---|---|---|---|
| Rich | 0.16% | 0.15% | 650 ppm | 0.70% | 0.20% | 3% | balance |
| Lean | 7.9% | 0.14% | 620 ppm | 780 ppm | — | 3% | balance |

EXAMPLE 2

Four types of the first powders were prepared in substantially the same manner as in Example 1, except that zirconia powder having an average particle diameter of 5 μm was used instead of the alumina powder. The first powder of each type was mixed with the second powder substantially the same as in Example 1, thereby preparing four types of pellet catalysts.

Using 2.0 g of each of the obtained pellet catalysts of Example 2, the NO removing rates during an initial period and after the endurance test were determined substantially in the same manner as in Example 1. Results are indicated in FIGS. 2 and 3.

COMPARATIVE EXAMPLE 1

Figure 4:
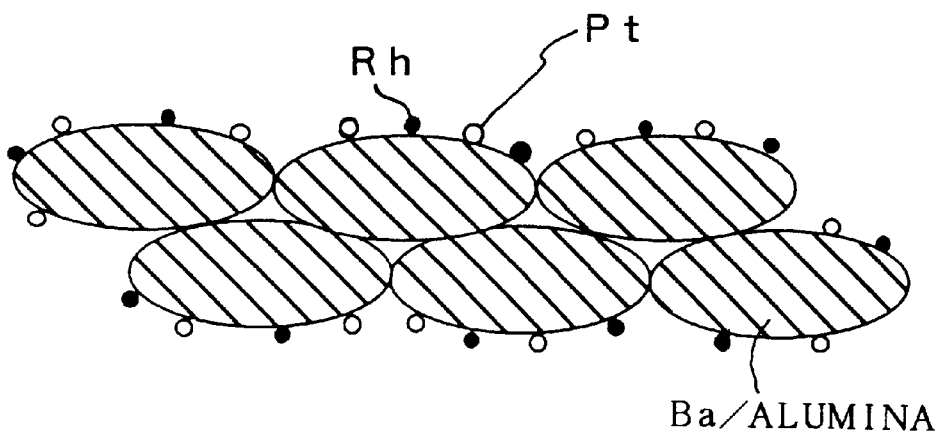
FIG. 4 is an enlarged illustration of the structure of an exhaust gas purifying catalyst of Comparative Example 1.

FIG. 4 schematically illustrates the structure of an exhaust gas purifying catalyst of Comparative Example 1.

Preparation of Powder

Alumina powder having an average particle diameter of 5 μm was impregnated with a predetermined amount of a barium acetate aqueous solution of a predetermined concentration, and then dried at 100° C. for 3 hours, and baked at 500° C. for 2 hours, thereby supporting Ba in the alumina powder. The amount of Ba supported was 0.2 mole relative to 120 g of the alumina powder.

Subsequently, the thus-obtained Ba-carrying alumina powder was impregnated with a 15g/L ammonium bicarbonate aqueous solution, and then dried at 110° C. for 3 hours. Thereby, Ba was converted into barium carbonate and supported uniformly in the alumina powder.

The Ba/alumina powder was impregnated with a predetermined amount of a dinitrodiammine platinum nitrate aqueous solution of a predetermined concentration, and dried at 110° C. for 3 hours, and then dried at 250° C. for 2 hours, thereby supporting Pt in the powder. The amount of Pt supported was 1.0 g relative to 120 g of the alumina powder.

Subsequently, the obtained Pt-carrying Ba/alumina powder was impregnated with a predetermined amount of a rhodium nitrate aqueous solution of a predetermined concentration, and then dried at 110° C. for 3 hours, and baked at 250° C. for 2 hours, thereby supporting Rh in the powder. As for the amount of Rh supported, four different levels were selected, that is 0.05 g, 0.25 g, 0.5 g relative to 120 g of the alumina powder. Thus, four types of the catalyst powders were prepared.

Preparation of Catalyst

Each type of catalyst powder was formed into pellets by the standard method, thereby preparing four types of pellet catalysts. Using the obtained pellet catalysts of Comparative Example 1, the NO removing rates both during an initial period and after the endurance test were determined substantially in the same manner as in Example 1. Results are indicated in FIGS. 2 and 3.

Evaluation

As indicated from FIGS. 2 and 3, the NO removing rate decreased as the amount of Rh supported increased in Comparative Example 1, whereas in Examples 1 and 2, the NO removing rate increased as the amount of Rh supported increased. It is clear that this difference was achieved due to the separate supporting of Rh and Pt in Examples 1 and 2.

Furthermore, it is also indicated that as the porous particles of the first powder, the zirconia powder (Example 2) exhibited a higher NO removing rate than the alumina powder (Example 1).

This tendency is similarly indicated in FIGS. 2 and 3 although the difference in FIG. 3 is smaller than that in FIG. 2. That is, it is clearly indicated that the exhaust gas purifying catalysts of these examples exhibited high NO removing rates both during the initial period and after the endurance test.

Although in the foregoing examples, the pellet catalysts were formed and investigated, it should be apparent that a monolithic catalyst formed by coating a cordierite or metal foil-formed honeycomb base with a coating layer containing a mixture of the first powder and the second powder as a main component will achieve substantially the same advantages as achieved by the pellet catalysts.

(2) Example of Second Series

EXAMPLE 3

Preparation of First Powder

Alumina powder having an average particle diameter of 5 μm was impregnated with a predetermined amount of a rhodium nitrate aqueous solution of a predetermined concentration, and then dried at 110° C. for 3 hours, and baked at 250° C. for 2 hours, thereby supporting Rh in the alumina powder. The amount of Rh supported was 0.3 g relative to 120 g of the alumina powder.

Preparation of Second Powder

Alumina powder having an average particle diameter of 5μ was impregnated with a predetermined amount of a barium acetate aqueous solution of a predetermined concentration, and then dried at 110° C. for 5 hours, and baked at 500° C. for 2 hours, thereby supporting Ba in the alumina powder. The amount of Ba supported was 0.3 mole relative to 120 g of the alumina powder.

Subsequently, the thus-obtained Ba-carrying alumina powder was impregnated with 1.2 L of a 15-g/L ammonium bicarbonate aqueous solution, and then dried at 110° C. for 5 hours. Thereby, Ba was converted into barium carbonate and supported uniformly in the alumina powder.

The Ba/alumina powder was impregnated with a predetermined amount of a dinitrodiammine platinum nitrate aqueous solution of a predetermined concentration, and dried at 110° C. for 2 hours, and then baked at 400° C. for 2 hours, thereby supporting Pt in the powder. The amount of Pt supported was 2.0 g relative to 120 g of the alumina powder. The second powder was thus prepared.

Supporting of Transition Metal

Equal amounts of the first powder and the second powder were mixed. The mixed powder was impregnated with a cobalt nitrate aqueous solution, and dried at 110° C. for 5 hours and then baked at 400° C. at 2 hours, thereby supporting Co in the powder. The amount of Co supported was 0.1 mole relative to 120 g of the mixed powder.

Figure 5:
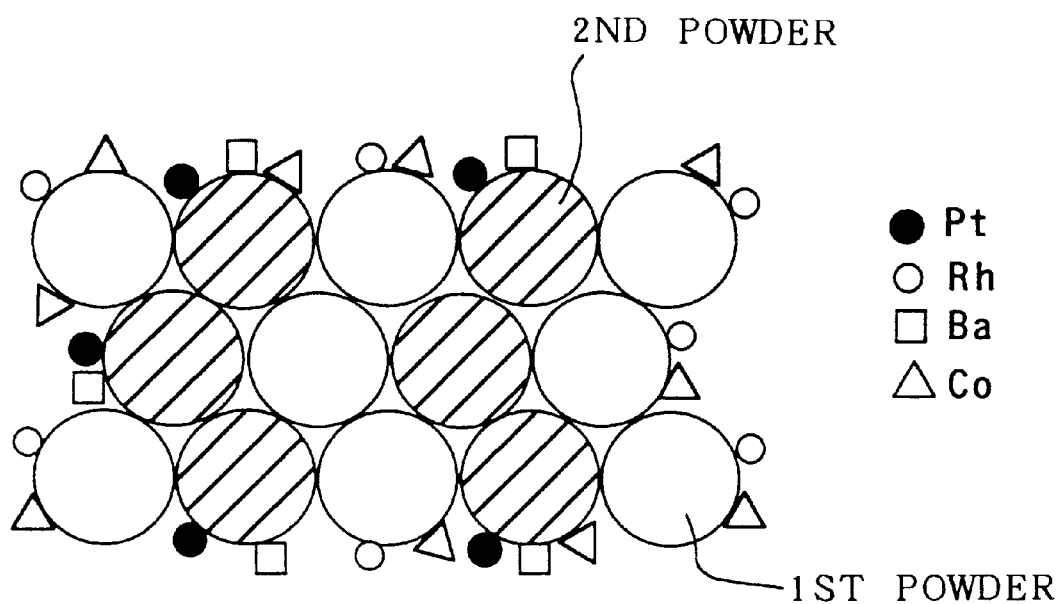
FIG. 5 is an illustration of the structure of an exhaust gas purifying catalyst of Example 3 of the invention.

The obtained powder was formed into pellets by the standard method, thereby preparing a catalyst of Example 3. FIG. 5 schematically illustrates the structure of the pellet catalyst.

Evaluation Test

The obtained pellet catalyst was disposed in an evaluation test device, and the model gases described in Table 1 were passed through. More specifically, the rich model gas the lean model gas were separately allowed to flow at an in-coming gas temperature of 350° C., at a flow rate of 2 L/min. The amount of NO adsorbed and the amount of NO reduced were determined for each catalyst from the difference between the NO concentration in the gas coming in to the catalyst and the NO concentration in the gas going out from the catalyst. Results are shown in Table 4.

Endurance test was performed by allowing endurance rich and lean model gases shown in Table 3 to flow for 8 hours at an in-coming gas temperature of 600° C. while switching between the two gases in a pattern of 1 minutes for the rich gas and 4 minutes for the lean gas. After that, the amount of sulfur-poisoning (S-poisoning) was determined from the element quantitative analysis of each catalyst after the endurance test. Using the catalyst after the endurance test, the amount of NO adsorbed and the amount of NO reduced were determined in the manner as described above. Results are shown in Table 4.

TABLE 3

| Atmosphere | $O_2$ % | NO % | $C_8H_6$ ppm | CO | $H_2$ % | $SO_2$ ppm | $H_2O$ % | $N_2$ |
|---|---|---|---|---|---|---|---|---|
| Rich | 0.16 | 0.15 | 650 | 0.70% | 0.20 | 160 | 3 | balance |
| Lean | 7.9 | 0.14 | 620 | 780 ppm | — | 160 | 3 | balance |

EXAMPLE 4

A mixed powder was prepared substantially in the same manner as in Example 3, using a first powder substantially the same as in Example 3 and a second powder that was prepared substantially the same manner as in Example 3, except that a mixed aqueous solution of barium acetate and cobalt nitrate was used instead of the barium acetate aqueous solution. The mixed powder was directly used to form a pellet catalyst of Example 4. The amounts of Ba and Co in the second powder were 0.3 mole and 0.1 mole, respectively, relative to 120 g of the alumina powder.

Using the obtained pellet catalyst of Example 4, the amount of NO adsorbed and the amount of NO reduced and the amount of sulfur-poisoning both during the initial period and after the endurance test were determined in substantially the same as in Example 3. Results are shown in Table 4.

EXAMPLE 5

Alumina powder having an average particle diameter of 5 μm was impregnated with a predetermined amount of a cobalt nitrate aqueous solution of a predetermined concentration, and then dried at 110° C. for 5 hours, and baked at 500° C. for 2 hours. The amount of Co supported was 0.1 mole relative to 120 g of the alumina powder. The Co-carrying alumina powder was impregnated with a predetermined amount of a rhodium nitrate aqueous solution of a predetermined concentration, and dried at 110° C. for 3 hours and then baked at 250° C. for 2 hours, thereby preparing the first powder.

Using the thus-prepared first powder and the second powder prepared substantially in the same manner as in Example 3, a mixed powder was prepared substantially in the same manner as in Example 3. The mixed powder was directly used to prepare a pellet catalyst of Example 5.

Using the obtained pellet catalyst of Example 5, the amount of NO adsorbed and the amount of NO reduced and the amount of sulfur-poisoning both during the initial period and after the endurance test were determined in substantially the same as in Example 3. Results are shown in Table 4.

COMPARATIVE EXAMPLE 2

Alumina powder having an average particle diameter of 5 μm was impregnated with a predetermined amount of a barium acetate aqueous solution of a predetermined concentration, and then dried at 110° C. for 3 hours, and baked at 500° C. for 2 hours, thereby supporting Ba in the alumina powder. The amount of Ba supported was 0.3 mole relative to 120 g of the alumina powder.

Subsequently, the thus-obtained Ba-carrying alumina powder was impregnated with a 15-g/L ammonium bicarbonate aqueous solution, and then dried at 110° C. for 3 hours. Thereby, Ba was converted into barium carbonate and supported uniformly in the alumina powder.

The Ba/alumina powder was impregnated with a predetermined amount of a dinitrodiammine platinum nitrate aqueous solution of a predetermined concentration, and dried at 110° C. for 3 hours, and then dried at 250° C. for 2 hours, thereby supporting Pt in the powder. The amount of Pt supported was 2.0 g relative to 120 g of the alumina powder.

Subsequently, the obtained Pt-carrying Ba/alumina powder was impregnated with a predetermined amount of a rhodium nitrate aqueous solution of a predetermined concentration, and then dried at 110° C. for 3 hours, and baked at 250° C. for 2 hours, thereby supporting Rh in the powder. The amount of Rh supported was 0.3 g relative to 120 g of the alumina powder.

The obtained catalyst powder was formed into pellets by the standard method, thereby preparing a pellet catalyst of Comparative Example 2. Using the obtained pellet catalyst of Comparative Example 2, the amount of NO adsorbed and the amount of NO reduced and the amount of sulfur-poisoning both during the initial period and after the endurance test were determined in substantially the same as in Example 3. Results are shown in Table 4.

Evaluation

TABLE 4

|  | NO adsorbed ($10^{-4}$ mole) Initial After period endurance test | | NO reduced ($10^{-4}$ mole) Initial After period endurance test | | S-poisoning after endurance test (wt. %) |
| --- | --- | --- | --- | --- | --- |
| Ex. 3 | 1.6 | 1.4 | 0.43 | 0.32 | 0.58 |
| Ex. 4 | 1.7 | 1.5 | 0.45 | 0.33 | 0.42 |
| EX. 5 | 1.7 | 1.5 | 0.44 | 0.31 | 0.44 |
| Com. Ex. 2 | 1.7 | 1.2 | 0.46 | 0.20 | 1.04 |

As can be seen in Table 4, the catalysts of the examples improved in the amount of NO adsorbed and the amount of NO reduced after the endurance test, compared with Comparative Example 2. Particularly, the improvement in the amount of NO reduced was great. Furthermore, it can be seen that the catalyst of the examples considerably reduced the sulfur-poisoning, compared with Comparative Example 2.

That is, it is clear that the exhaust gas purifying catalysts of the examples achieved high NO removing rates both during the initial period and after the endurance test.

Although the above examples have been described in conjunction with employment of Co as a promoter, it should be noted that employment of Fe or NI as a single component, instead of Co, or combinations of two or three components, achieved substantially the same results.

Although the examples have been described in conjunction with the pellet catalysts, it should be apparent that a monolithic catalyst formed by coating a cordierite or metal foil-formed honeycomb base with a coating layer containing a mixture of the first powder and the second powder as a main component will achieve substantially the same advantages as achieved by the pellet catalysts.

(3) Examples of Third Series

EXAMPLE 6

Preparation of First Powder 1200 g of zirconia powder having an average particle diameter of 5 μm was impregnated with a predetermined amount of a rhodium nitrate aqueous solution of a predetermined concentration, and then dried at 110° C. for 3 hours, and baked at 250° C. for 2 hours, thereby supporting Rh in the powder. The amount of Rh supported was 3.0 g relative to 720 g of the zirconia powder.

Preparation of Second Powder

Alumina powder having an average particle diameter of 5 μm was impregnated with a predetermined amount of a barium acetate aqueous solution of a predetermined concentration, and then dried at 110° C. for 3 hours, and baked at 500° C. for 2 hours, thereby supporting Ba in the alumina powder. The amount of Ba supported was 2 moles relative to 1200 g of the alumina powder.

Subsequently, the thus-obtained Ba-carrying alumina powder was impregnated with 5 L of a 20-g/L ammonium bicarbonate aqueous solution, and then dried at 110° C. for 3 hours. Thereby, Ba was converted into barium carbonate and supported uniformly in the alumina powder.

The Ba/alumina powder was impregnated with a predetermined amount of a dinitrodiammine platinum nitrate aqueous solution of a predetermined concentration, and dried at 110° C. for 3 hours, and then dried at 250° C. for 2 hours, thereby supporting Pt in the powder. The amount of Pt supported was 20 g relative to 1200 g of the alumina powder.

The obtained Ba-Pt/alumina powder was impregnated with a predetermined amount of a rhodium nitrate aqueous solution of a predetermined concentration, and dried at 110° C. for 3 hours, and then baked at 250° C. for 2 hours, thereby supporting Rh in the powder. The amount of Rh supported was 1% by weight relative to the amount of Pt supported, and 0.2 g relative to 1200 g of the alumina powder. The second powder was thus prepared.

Results of an X-ray diffrreaction analysis verified that Pt and Rh were in the form of a solid solution in the second powder.

Preparation of Catalyst 240 parts by weight of the first powder and 320 parts by weight of the second powder were uniformly mixed, and further mixed with 235 parts by weight of a 40-wt. % aluminum nitrate nonahydrate aqueous solution, 15 parts by weight of an alumina-based binder and 540 parts by weight of water, thereby preparing a slurry. A prepared cordierite-made honeycomb base member was dipped into the slurry, and pulled up therefrom. After an extraneous amount of slurry was blown off, the honeycomb base was dried and baked, thereby forming coating layers. A honeycomb catalyst was thereby prepared. The coating layer formed was 290 g relative to 1 liter of the honeycomb base member. The amount of Rh supported relative to 1 litter of the honeycomb base member was 0.15 g in the first powder and 0.01 g in the second powder.

Figure 6:
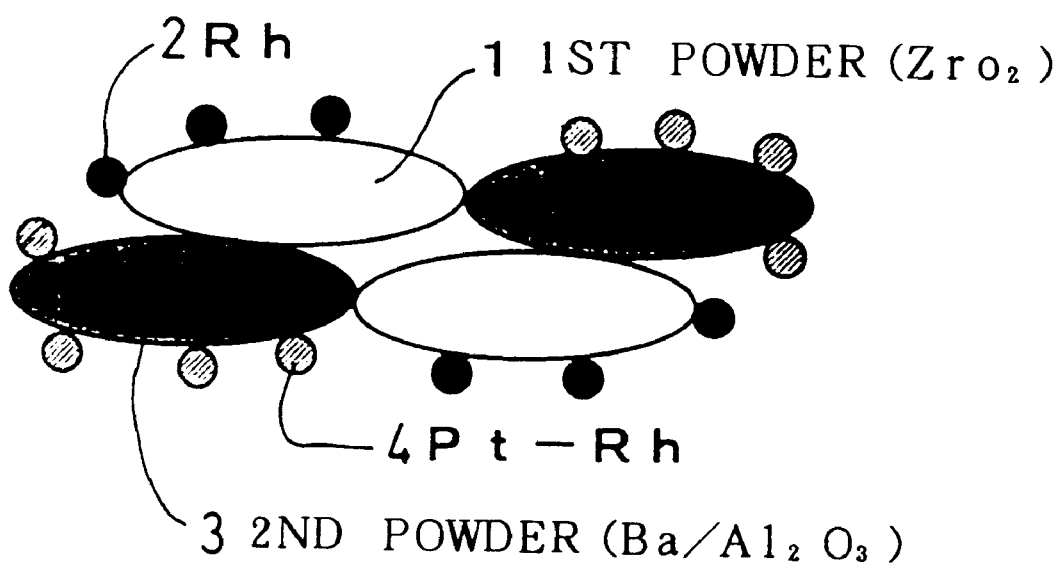
FIG. 6 is an illustration of the structure of an exhaust gas purifying catalyst of Example 6 of the invention.

FIG. 6 schematically illustrates the structure of a coating layer of the honeycomb catalyst. Referring to FIG. 6, particles of the first powder (zirconia powder) 1 support Rh 2, and particles of the second powder (Ba/alumina powder) 3 support a Pt/Rh solid solution 4.

Evaluation Test

Figure 7:
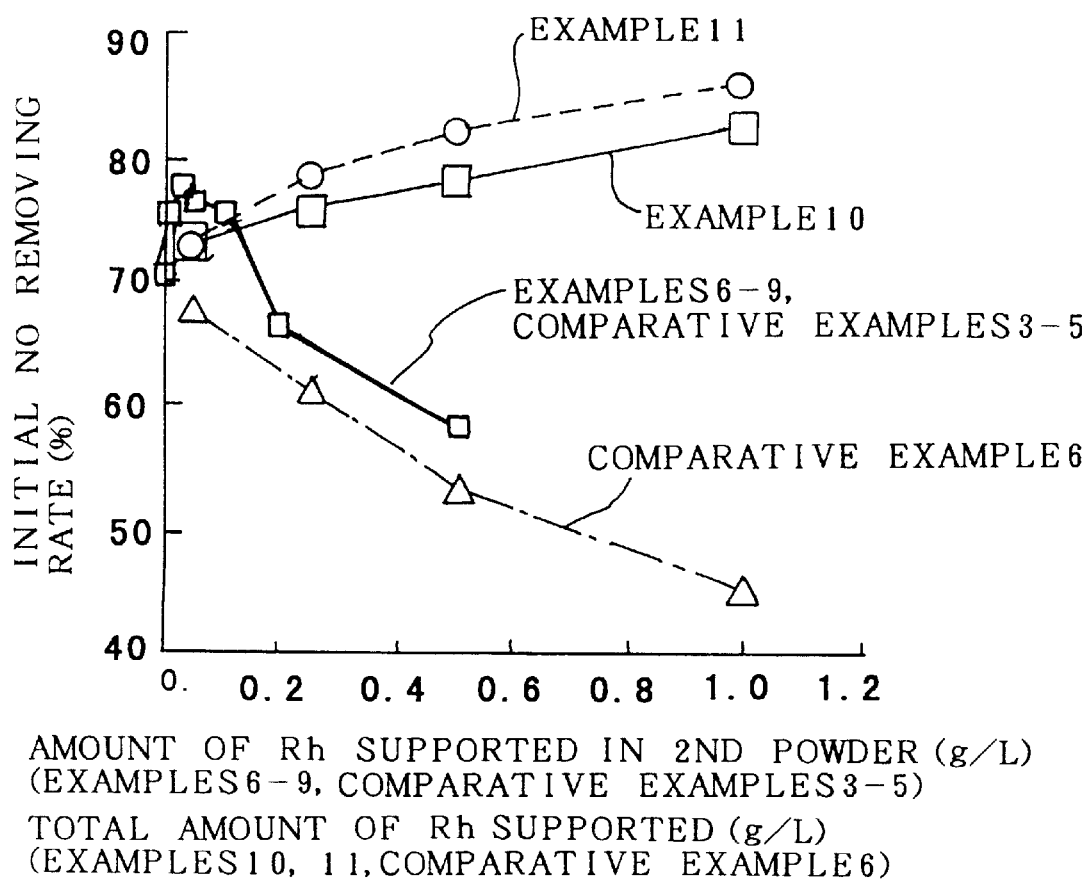
FIG. 7 is a graph indicating the relationship between the amount of Rh supported and the NO removing rate during an initial period.

The obtained honeycomb catalyst was disposed in an evaluation test device, and the model gases described in Table 1 were passed through. More specifically, the rich model gas and the lean model gas were alternately allowed to flow at an in-coming gas temperature of 350° C., at a flow rate of 2 L/min for two minutes respectively. The transitional NO removing rate of the catalyst was determined from the difference between the NO concentration in the gas coming in to the catalyst and the NO concentration in the gas going out from the catalyst. Results are indicated in FIG. 7.

Figure 8:
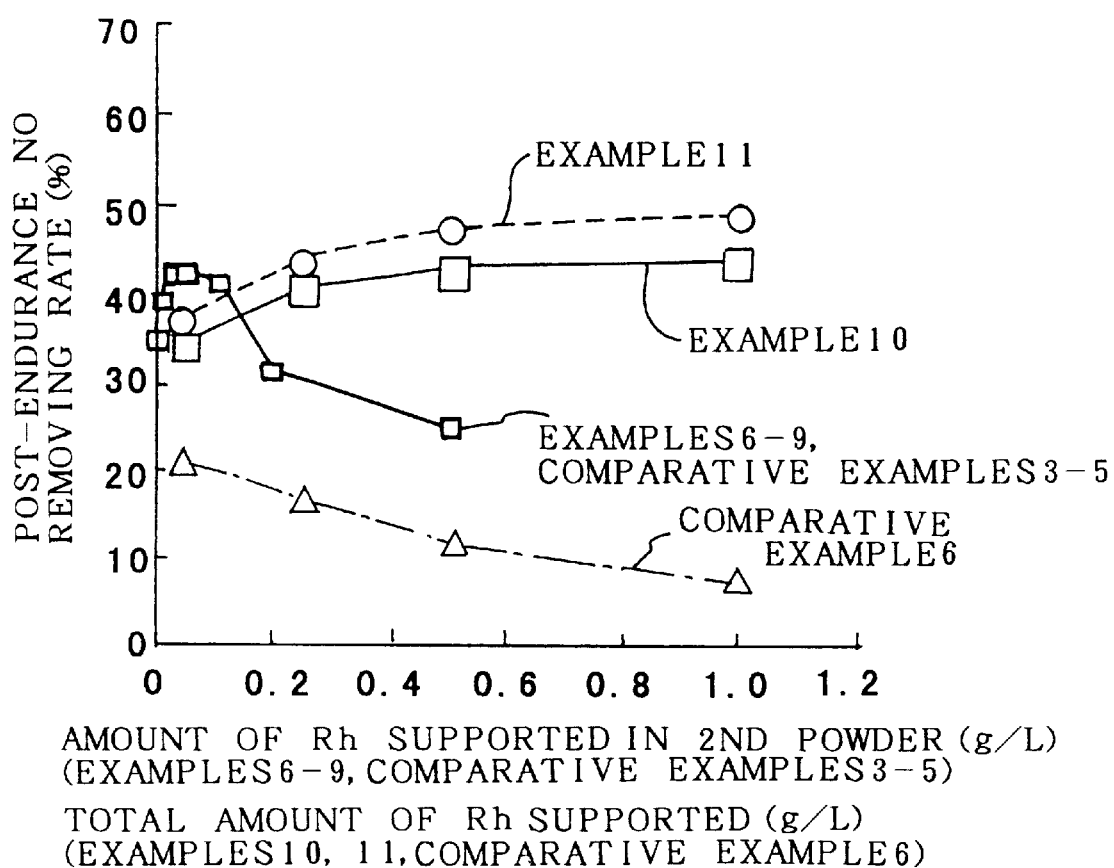
FIG. 8 is a graph indicating the relationship between the amount of Rh supported and the NO removing rate after the endurance test.

Endurance test was performed by allowing the endurance rich and lean model gases shown in Table 2 to flow for 10 hours at an in-coming gas temperature of 800° C. while switching between the two gases in a pattern of 1 minutes for the rich gas and 4 minutes for the lean gas. After that, the transitional NO removing rates were determined in the manner described above. Results are indicated in FIG. 8.

EXAMPLE 7

The second powder was prepared substantially in the same manner as in Example 6, except that the amount of Rh supported was 2.5% by weight relative to the amount of Pt supported, that is, 0.5 g relative to 1200 g of the alumina powder. The second powder was mixed with the first powder substantially the same as the first powder in Example 6, in substantially the same manner as in Example 6, thereby preparing a honeycomb catalyst. The amount of Rh supported relative to 1 liter of the honeycomb base member was 0.15 g in the first powder and 0.025 g in the second powder.

Using the obtained honeycomb catalyst of Example 7, the NO removing rates both during the initial period and after the endurance test were determined substantially in the same manner as in Example 6. Results are indicated in FIGS. 7 and 8.

EXAMPLE 8

The second powder was prepared substantially in the same manner as in Example 6, except that the amount of Rh supported was 5% by weight relative to the amount of Pt supported, that is, 1 g relative to 1200 g of the alumina powder. The second powder was mixed with the first powder substantially the same as the first powder in Example 6, in substantially the same manner as in Example 6, thereby preparing a honeycomb catalyst. The amount of Rh supported relative to 1 liter of the honeycomb base member was 0.15 g in the first powder and 0.05 g in the second powder.

Using the obtained honeycomb catalyst of Example 8, the NO removing rates both during the initial period and after the endurance test were determined substantially in the same manner as in Example 6. Results are indicated in FIGS. 7 and 8.

EXAMPLE 9

The second powder was prepared substantially in the same manner as in Example 6, except that the amount of Rh supported was 10% by weight relative to the amount of Pt supported, that is, 2 g relative to 1200 g of the alumina powder. The second powder was mixed with the first powder substantially the same as the first powder in Example 6, in substantially the same manner as in Example 6, thereby preparing a honeycomb catalyst. The amount of Rh supported relative to 1 liter of the honeycomb base member was 0.15 g in the first powder and 0.1 g in the second powder.

Using the obtained honeycomb catalyst of Example 9, the NO removing rates both during the initial period and after the endurance test were determined substantially in the same manner as in Example 6. Results are indicated in FIGS. 7 and 8.

COMPARATIVE EXAMPLE 3

The second powder was prepared substantially in the same manner as in Example 6, except that Rh was not supported. The second powder was mixed with the first powder substantially the same as the first powder in Example 6, in substantially the same manner as in Example 6, thereby preparing a honeycomb catalyst. The amount of Rh supported relative to 1 liter of the honeycomb base member was 0.15 g in the first powder.

Using the obtained honeycomb catalyst of Comparative Example 3, the NO removing rates both during the initial period and after the endurance test were determined substantially in the same manner as in Example 6. Results are indicated in FIGS. 7 and 8.

COMPARATIVE EXAMPLE 4

The second powder was prepared substantially in the same manner as in Example 6, except that the amount of Rh supported was 20% by weight relative to the amount of Pt supported, that is, 4 g relative to 1200 g of the alumina powder. The second powder was mixed with the first powder substantially the same as the first powder in Example 6, in substantially the same manner as in Example 6, thereby preparing a honeycomb catalyst. The amount of Rh supported relative to 1 liter of the honeycomb base member was 0.15 g in the first powder and 2.0 g in the second powder.

Using the obtained honeycomb catalyst of Comparative Example 4, the NO removing rates both during the initial period and after the endurance test were determined substantially in the same manner as in Example 6. Results are indicated in FIGS. 7 and 8.

COMPARATIVE EXAMPLE 5

The second powder was prepared substantially in the same manner as in Example 6, except that the amount of Rh supported was 50% by weight relative to the amount of Pt supported, that is, 10 g relative to 1200 g of the alumina powder. The second powder was mixed with the first powder substantially the same as the first powder in Example 6, in substantially the same manner as in Example 6, thereby preparing a honeycomb catalyst. The amount of Rh supported relative to 1 liter of the honeycomb base member was 0.15 g in the first powder and 0.5 g in the second powder.

Using the obtained honeycomb catalyst of Comparative Example 5, the NO removing rates both during the initial period and after the endurance test were determined substantially in the same manner as in Example 6. Results are indicated in FIGS. 7 and 8.

EXAMPLE 10

Preparation of First Powder

Alumina powder having an average particle diameter of 5 $\mu$m was impregnated with a predetermined amount of a rhodium nitrate aqueous solution of a predetermined concentration, and then dried at 110° C. for 3 hours, and baked at 250° C. for 2 hours, thereby supporting Rh in the alumina powder. As for the amount of Rh supported, four different levels were selected, that is, 0.1 g, 0.5 g, 1.0 g and 2.0 g relative to 120 g of the alumina powder. Thus, four types of the first powders were prepared.

Preparation of Second Powder

Alumina powder having an average particle diameter of 5 $\mu$m was impregnated with a predetermined amount of a barium acetate aqueous solution of a predetermined concentration, and then dried at 110° C. for 3 hours, and baked at 500° C. for 2 hours, thereby supporting Ba in the alumina powder. The amount of Ba supported was 0.3 mole relative to 120 g of the alumina powder.

Subsequently, the thus-obtained Ba-carrying alumina powder was impregnated with a 15-g/L ammonium bicarbonate aqueous solution, and then dried at 110° C. for 3 hours. Thereby, Ba was converted into barium carbonate and supported uniformly in the alumina powder.

The Ba/alumina powder was impregnated with a predetermined amount of a dinitrodiammine platinum nitrate aqueous solution of a predetermined concentration, and dried at 110° C. for 3 hours, and then dried at 250° C. for 2 hours, thereby supporting Pt in the powder. The amount of Pt supported was 2.0 g relative to 120 g of the alumina powder. The second powder was thus prepared.

Preparation of Catalyst

Equal amounts of the first powder and the second powder by weight ratio were uniformly mixed, and then formed into honeycomb catalysts substantially in the same manner as in Example 6. The amounts of Rh supported relative to 1 litter of the honeycomb catalyst were 0.05 g, 0.25 g, 0.5 g and 1.0 g.

Figure 9:
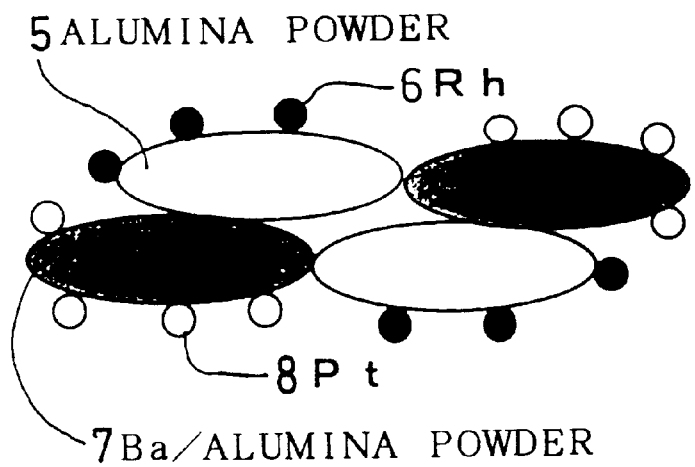
FIG. 9 is an illustration of the structure of an exhaust gas purifying catalyst of Example 10 of the invention.

FIG. 9 schematically illustrates the structure of a coating layer of the honeycomb catalysts. Referring to FIG. 9, particles of the first powder (alumina powder) 5 support Rh 6, and particles of the second powder (Ba/alumina powder) 7 supports Pt 8. Thus, Pt and Rh are supported apart from each other.

Using the obtained honeycomb catalysts, the NO removing rates both during the initial period and after the endurance test were determined substantially in the same manner as in Example 6. Results are indicated in FIGS. 7 and 8.

EXAMPLE 11

Four types of the first powders were prepared in substantially the same manner as in Example 10, except that zirconia powder having an average particle diameter of 5 μm was used instead of the alumina powder. The first powder of each type was mixed with the second powder substantially the same as in Example 10, thereby preparing four types of honeycomb catalysts.

Using the obtained honeycomb catalysts of Example 11, the NO removing rates during the initial period and after the endurance test were determined substantially in the same manner as in Example 6. Results are indicated in FIGS. 7 and 8.

COMPARATIVE EXAMPLE 6

Alumina powder having an average particle diameter of 5 μm was impregnated with a predetermined amount of a barium acetate aqueous solution of a predetermined concentration, and then dried at 110° C. for 3 hours, and baked at 500° C. for 2 hours, thereby supporting Ba in the alumina powder. The amount of Ba supported was 0.3 mole relative to 120 g of the alumina powder.

Subsequently, the thus-obtained Ba-carrying alumina powder was impregnated with a 15-g/L ammonium bicarbonate aqueous solution, and then dried at 110° C. for 3 hours. Thereby, Ba was converted into barium carbonate and supported uniformly in the alumina powder.

The Ba/alumina powder was impregnated with a predetermined amount of a dinitrodiammine platinum nitrate aqueous solution of a predetermined concentration, and dried at 110° C. for 3 hours, and then dried at 250° C. for 2 hours, thereby supporting Pt in the powder. The amount of Pt supported was 2 g relative to 120 g of the alumina powder.

Subsequently, the obtained Pt-carrying Ba/alumina powder was impregnated with a predetermined amount of a rhodium nitrate aqueous solution of a predetermined concentration, and then dried at 110° C. for 3 hours, and baked at 250° C. for 2 hours, thereby supporting Rh in the powder. As for the amount of Rh supported, four different levels were selected, that is, 0.05 g, 0.25 g, 0.5 g and 1.0 g relative to 120 g of the alumina powder. Thus, four types of the catalyst powders were prepared.

Figure 10:
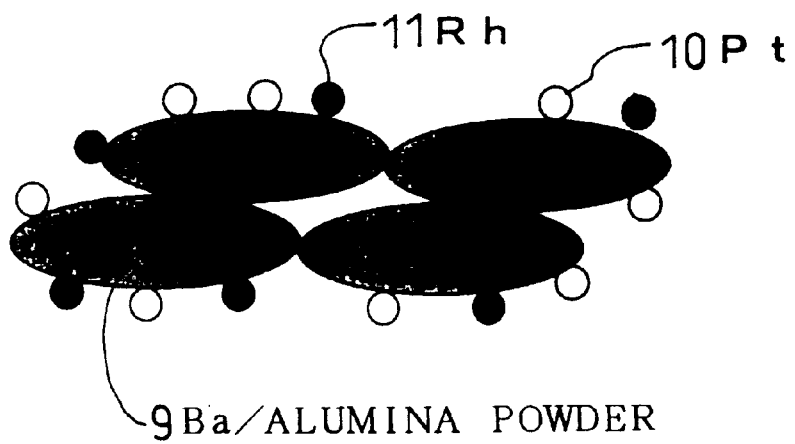
FIG. 10 is an illustration of the structure of an exhaust gas purifying catalyst of Comparative Example 6.

FIG. 10 schematically illustrates the structure of the exhaust gas purifying catalysts (conventional type) of Comparative Example 6. Referring to FIG. 10, particles of the Ba/alumina powder 9 support Pt 10 and Rh 11 adjacent to each other.

Each type of catalyst powder was formed into pellets by the standard method, thereby preparing four types of pellet catalysts. Using the obtained pellet catalysts of Comparative Example 6, the NO removing rates both during the initial period and after the endurance test were determined substantially in the same manner as in Example 6. Results are indicated in FIGS. 7 and 8.

Evaluation

As indicated from FIGS. 7 and 8, the NO removing rate decreased as the amount of Rh supported increased in Comparative Example 6, whereas in Examples 10 and 11, the NO removing rate increased as the amount of Rh supported increased. It is clear that this difference was achieved due to the separate supporting of Rh and Pt in Examples 10 and 11.

Furthermore, it is also indicated that as the porous particles of the first powder, the zirconia powder (Example 11) exhibited a slightly higher NO removing rate than the alumina powder (Example 10).

This tendency is similarly indicated in FIGS. 7 and 8 although the difference in FIG. 8 is smaller than that in FIG. 7. That is, it is clearly indicated that the exhaust gas purifying catalysts of Examples 10, 11 exhibited high NO removing rates both during the initial period and after the endurance test.

Example 6–9 exhibited higher NO removing rates both during the initial period and after the endurance test than Examples 10, 11, within ranges where the amount of Rh supported in the second powder is relatively small. Therefore, it is clearly indicated that the supporting a predetermined amount of Rh in the second powder together with Pt improves the NOx purifying performance.

It is also indicated that if no Rh is supported in the second powder or if Rh is supported in the second powder in an amount of 0.2 g/L or more as in Comparative Examples 3–5, the NO removing rate becomes inconveniently lower than Examples 10, 11. Thus, lack of Rh in the second powder or excessive amounts of Rh supported in the second powder is disadvantageous.

(4) Examples of Fourth Series

TEST EXAMPLE

With respect to various catalysts wherein different types of porous particles carried Rh, the amount of hydrogen produced in a rich atmosphere and a lean atmosphere was investigated.

Rh/Zirconia Catalyst (Catalyst 1)

120 g of zirconia powder was mixed into a predetermined amount of a rhodium nitrate aqueous solution of a predetermined concentration. After being stirred for a predetermined length of time, the mixture was filtered, and then dried at 110° C. for 3 hours and baked at 400° C. for 1 hour, thereby supporting Rh in the powder. The amount of Rh supported was 0.5 g relative to 120 g of the zirconia powder.

Rh/Zirconia-Mordenite Catalyst (Catalyst 2)

60 g of mordenite 203 powder was suspended in a zirconium oxynitrate aqueous solution of a predetermined concentration. The pH of the suspension was adjusted to 8 or higher by adding ammonia water. The suspension was filtered, and dried at 110° C., and then baked at 500° C. for 1 hour, thereby preparing zirconia-mordenite powder in which 60 g of zirconia was supported on 60 g of the mordenite 203 powder.

120 g of the zirconia-mordenite powder was mixed into a rhodium nitrate aqueous solution of a predetermined concentration. After being stirred for a predetermined length of time, the mixture was filtered, and then dried at 110° C. for 3 hours and baked at 400° C. for 1 hour, thereby supporting Rh in the powder. The amount of Rh supported was 0.5 g relative to 120 g of the zirconia-mordenite powder.

Rh/Zirconia Y-type Zeolite Catalyst (Catalyst 3)

60 g of USY 410 powder was suspended in a zirconium oxynitrate aqueous solution of a predetermined concentration. The pH of the suspension was adjusted to 8 or higher by adding ammonia water. The suspension was filtered, and dried at 110° C., and then baked at 500° C. for 1 hour, thereby preparing zirconia Y-type zeolite powder in which 60 g of zirconia was supported on 60 g of the USY 410 powder.

120 g of the zirconia Y-type zeolite powder was mixed into a rhodium nitrate aqueous solution of a predetermined concentration. After being stirred for a predetermined length of time, the mixture was filtered, and then dried at 110° C. for 3 hours and baked at 400° C. for 1 hour, thereby supporting Rh in the powder. The amount of Rh supported was 0.5 g relative to 120 g of the zirconia Y-type zeolite powder.

Rh/Alumina Zirconia Y-type Zeolite Catalyst A
(Catalyst 4)

60 g of USY 410 powder was suspended in a 2-propanol solution of aluminum isopropoxide and zirconium isopropoxide of predetermined concentrations (Al/Zr ratio=1/1), and refluxed at 80° C. A 2-propanol aqueous solution of a predetermined concentration was dropped thereinto and the suspension was stirred, so that hydrolysis occurred on the surfaces of the USY 410 powder. The suspension was vacuum-dried at 110° C. for 20 hours, and then baked at 500° C. for 1 hour, thereby supporting 60 g of an alumina-zirconia composite oxide on 60 g of the USY 410 powder.

120 g of the alumina zirconia Y-type-zeolite powder was mixed into a rhodium nitrate aqueous solution of a predetermined concentration. After being stirred for a predetermined length of time, the mixture was filtered, and then dried at 110° C. for 3 hours and baked at 400° C. for 1 hour, thereby supporting Rh in the powder. The amount of Rh supported was 0.5 g relative to 120 g of the alumina zirconia Y-type-zeolite powder.

Rh/Alumina Zirconia Y-type Zeolite Catalyst B
(Catalyst 5)

60 g of USY 410 powder was suspended in a mixed aqueous solution of zirconium oxynitrate and aluminum nitrate of predetermined concentrations (Al/Zr ratio=1/1). The pH of the suspension was adjusted to 8 of higher by adding ammonia water. The suspension was filtered, and dried at 110° C., and then baked at 500° C. for 1 hour, thereby supporting 60 g of an alumina-zirconia composite oxide on 60 g of the USY 410 powder.

120 g of the alumina zirconia Y-type-zeolite powder was mixed into a rhodium nitrate aqueous solution of a predetermined concentration. After being stirred for a predetermined length of time, the mixture was filtered, and dried at 110° C. for 3 hours and then baked at 400° C. for 1 hour, thereby supporting Rh in the powder. The amount of Rh supported was 0.5 g relative to 120 g of the alumina zirconia Y-type-zeolite powder.

Evaluation of Amount of Hydrogen Produced

Figure 11:
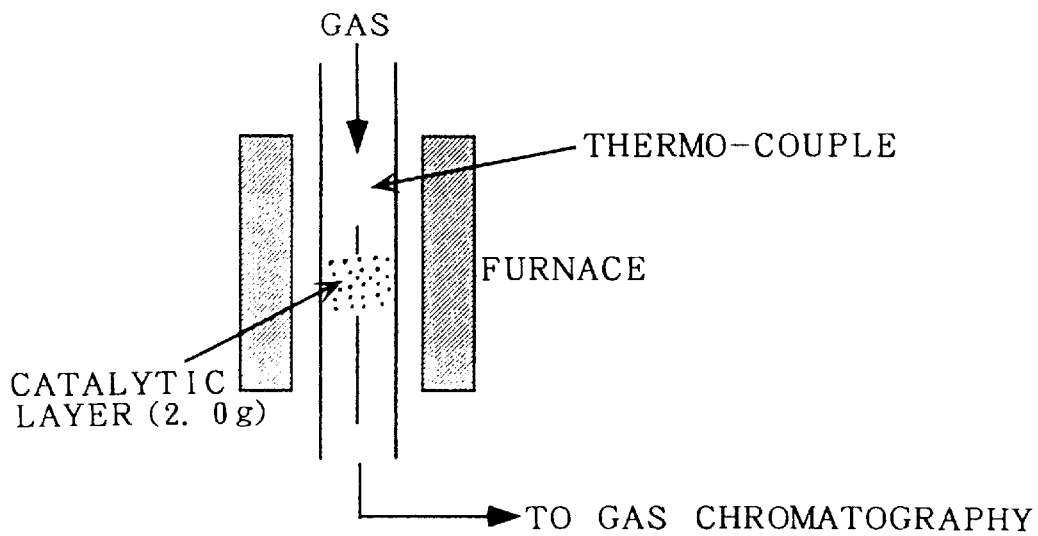
FIG. 11 illustrates the construction of a flow-type reactor used for test examples.

Each of the five types of catalysts was formed into pellets, and the amount of hydrogen produced on each pellet catalyst was evaluated. In experiments, two different gasses, that is, a rich atmosphere gas and a lean atmosphere gas as shown in Table 5, were separately passed, in an amount of 7 liters, through a flow-type reactor as shown in FIG. 11, at in-coming gas temperatures of 300–600° C., thereby causing reactions. The hydrogen concentration in the out-going gas was quantified by gas chromatography. Results are indicated in FIGS. 12 and 13.

TABLE 5

|  | $C_3H_6$ | CO | $O_2$ | $H_2O$ | $N_2$ |
|---|---|---|---|---|---|
| Rich | 6700 ppmC | 100 ppm | 0.6% | 3.0% | balance |
| Lean | 6700 ppmC | 100 ppm | 3.0% | 3.0% | balance |

Figure 12:
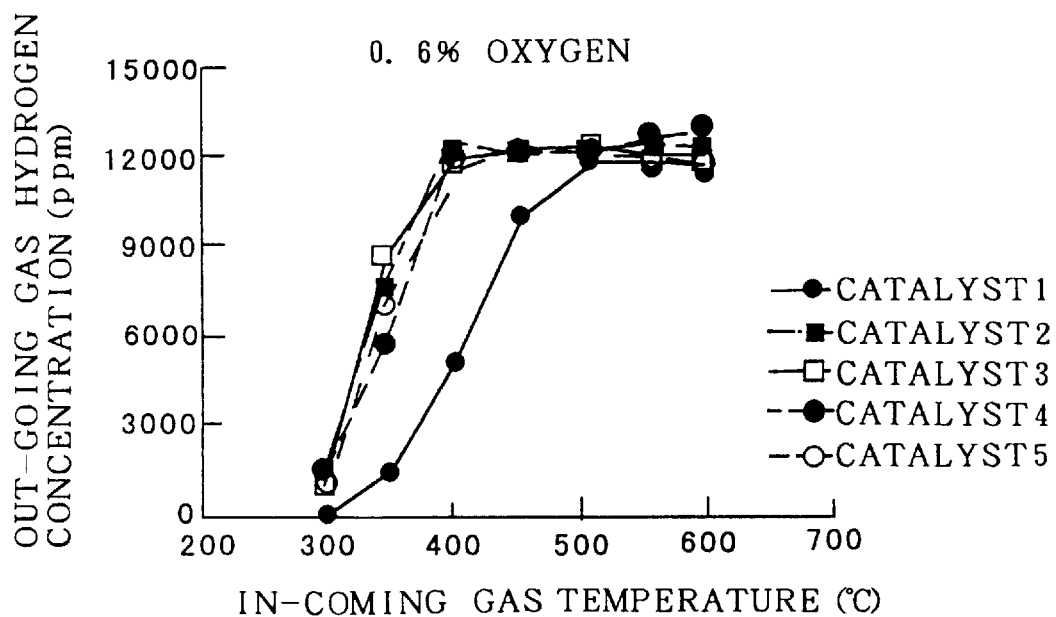
FIG. 12 indicates the relationship between the in-coming gas temperature and the hydrogen concentration in the out-going gas from the catalysts (test examples) in a rich atmosphere, on the basis of test results.
Figure 13:
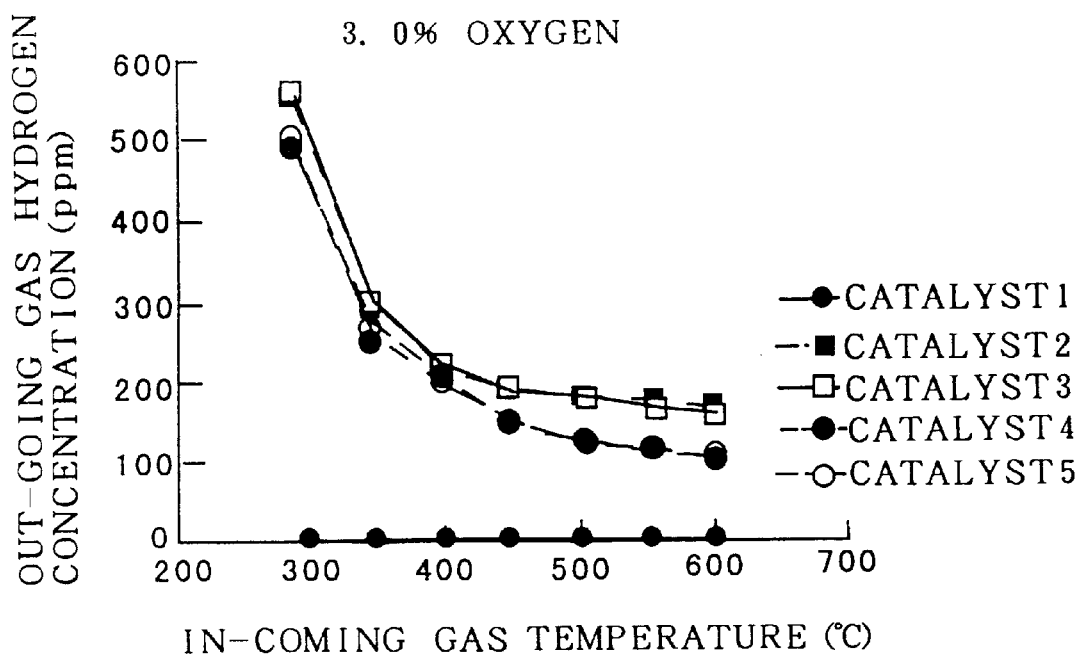
FIG. 13 indicates the relationship between the in-coming gas temperature and the hydrogen concentration in the out-going gas from the catalysts (test examples) in a lean atmosphere, on the basis of test results.

As indicated in FIGS. 12 and 13, Catalysts 2–5, containing zeolite, produced hydrogen efficiently even at low temperatures in the rich atmosphere, and also produced in the lean atmosphere. On the other hand, Catalyst 1, not containing zeolite, produced hydrogen in the rich atmosphere but did not produce hydrogen in the lean atmosphere.

With Catalysts 2–5, the presence of hydrogen was confirmed at high temperatures even in the excessive-oxygen lean atmosphere, indicating that hydrogen produced was not entirely oxidized but remained in the lean atmosphere. Therefore, use of the remaining amount of hydrogen for reduction may be considered.

EXAMPLE 12

Figure 14:
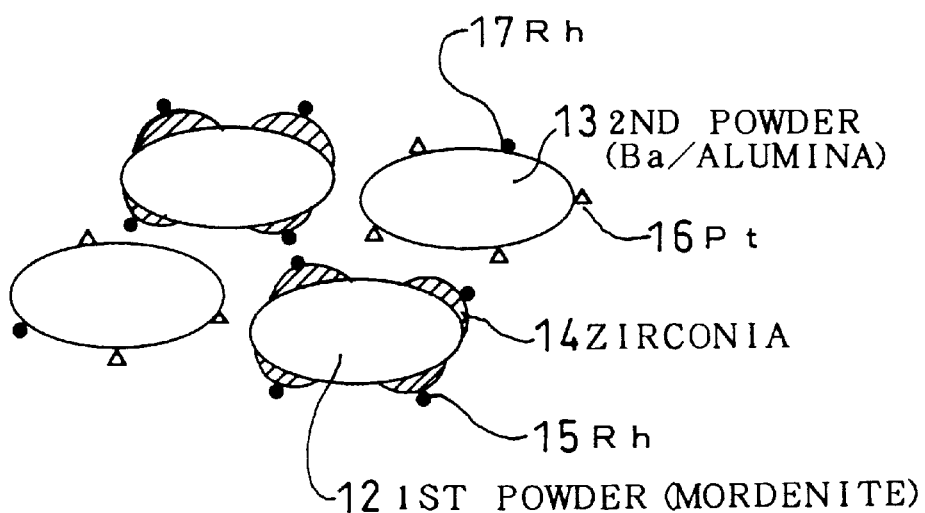
FIG. 14 is an illustration of the structure of a coating layer in an exhaust gas purifying catalyst of Example 12 of the invention.

FIG. 14 illustrates a portion of the exhaust gas purifying catalyst of Example 12. The exhaust gas purifying catalyst of this example formed of a honeycomb-shaped monolithic base (not shown), and coating layers formed on surfaces of the monolithic base. In a coating layer, particles of the first powder 12 and particles of the second powder 13 are present in a mixed state as shown in FIG. 14.

The first powder 12 is formed of mordenite, and supports zirconia 14, which in turn supports Rh 15. The second powder 13 is formed of alumina, where Ba is uniformly supported. The second powder supports Pt 16 and a small amount of Rh 17.

The method of producing the exhaust gas purifying catalyst will be described below. The structure of the exhaust gas purifying catalyst will become apparent in the description of the production method.

Preparation of First Powder 300 g of mordenite 203 powder was suspended in a zirconium oxynitrate aqueous solution of a predetermined concentration. The pH of the suspension was adjusted to 8 or higher by adding ammonia water. The suspension was filtered, and dried at 110° C., and then baked at 500° C. for 1 hour, thereby preparing zirconia Y-type zeolite powder in which 300 g of zirconia was supported on 300 g of USY 410 powder.

600 g of the zirconia Y-type zeolite powder was mixed into a rhodium nitrate aqueous solution of a predetermined concentration. After being stirred for a predetermined length of time, the mixture was filtered, and dried at 110° C. for 3 hours and then baked at 400° C. for 1 hour, thereby supporting Rh in the powder. The amount of Rh supported was 1.5 g relative to 600 g of the zirconia Y-type zeolite powder. Rh was selectively supported of zirconia because mordenite does not support Rh in a rhodium nitrate aqueous solution.

Preparation of Second Powder 1000 g of alumina powder having an average particle diameter of 5 μm was impregnated with a predetermined amount of a barium acetate aqueous solution of a predetermined concentration, and then dried at 110° C. for 3 hours, and baked at 500° C. for 1 hour, thereby supporting Ba in the alumina powder. The amount of Ba supported was 1.7 mole relative to 1000 g of the alumina powder.

Subsequently, the thus-obtained Ba-carrying alumina powder was dipped in 8 L of a 20-g/L ammonium bicarbonate aqueous solution for 15 minutes. After being filtered, the powder material was dried at 110° C. for 3 hours. Thereby, Ba was converted into barium carbonate and supported uniformly in the alumina powder.

The Ba/alumina powder was impregnated with a predetermined amount of a dinitrodiammine platinum nitrate aqueous solution of a predetermined concentration, and dried at 110° C. for 3 hours, and then dried at 250° C. for 2 hours, thereby supporting Pt in the powder. The amount of Pt supported was 16.7 g relative to 1000 g of the Ba/alumina powder. The second powder was thus prepared.

The obtained Pt/Ba/alumina powder was mixed into a predetermined amount of rhodium nitrate aqueous solution of a predetermined concentration. After being stirred for a predetermined length of time, the mixture was filtered, dried at 110° C. for 3 hours, and then baked at 400° C. for 1 hour, thereby supporting Rh in the powder. The amount of Rh supported was 0.83 g relative to 1000 g of the Pt/Ba/alumina powder.

Preparation of Catalyst

The entire amounts of the first powder and the second powder were uniformly mixed, and then water was added to form a slurry. A prepared cordierite-formed honeycomb monolithic base member having a capacity of 1.3 L was dipped into the slurry and then pulled up. After an extraneous amount of slurry was blown off, the monolithic base member was dried and baked, thereby forming coating layers. The exhaust gas purifying catalyst of Example 12 was thus prepared. The amount of slurry coating was 240 g relative to 1 liter of the monolithic base member.

EXAMPLE 13

300 g of USY 410 powder was suspended in a 2-propanol solution of aluminum isopropoxide and zirconium isopropoxide of predetermined concentrations (Al/Zr ratio=1/1), and refluxed at 80° C. A 2-propanol aqueous solution of a predetermined concentration was dropped thereinto and the suspension was stirred, so that hydrolysis occurred on the surfaces of the USY 410 powder. The suspension was vacuum-dried at 110° C. for 20 hours, and then baked at 500° C. for 1 hour, thereby supporting 300 g of an alumina-zirconia composite oxide on 300 g of the USY 410 powder.

600 g of the obtained alumina zirconia Y-type-zeolite powder was mixed into a rhodium nitrate aqueous solution of a predetermined concentration. After being stirred for a predetermined length of time, the mixture was filtered, and dried at 110° C. for 3 hours, and then baked at 400° C. for 1 hour, thereby supporting Rh in the powder. The amount of Rh supported was 1.5 g relative to 600 g of the alumina zirconia Y-type-zeolite powder.

Preparation of Catalyst

The entire amount of the first powder and the entire amount of the second powder substantially the same as in Example 12 were uniformly mixed, and then water was added to form a slurry. A prepared monolithic base member substantially the same as in Example 12 was dipped into the slurry and then pulled up. After an extraneous amount of slurry was blown off, the monolithic base member was dried and baked, thereby forming coating layers. The exhaust gas purifying catalyst of Example 13 was thus prepared. The amount of slurry coating was 240 g relative to 1 liter of the monolithic base member.

EXAMPLE 14

Figure 15:
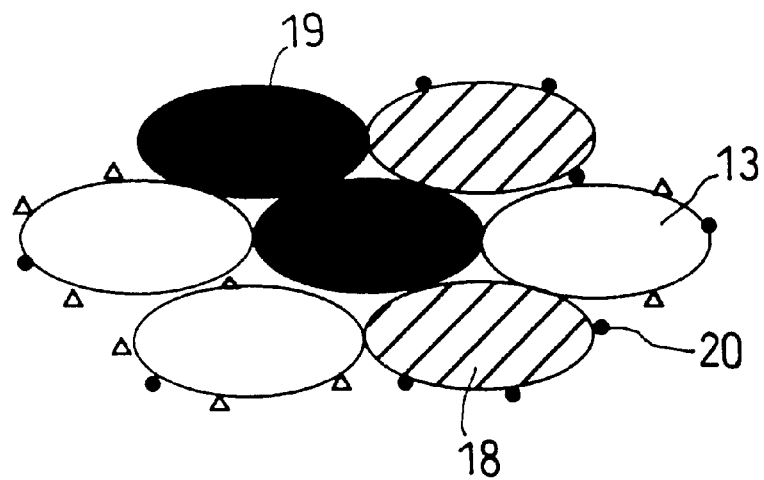
FIG. 15 is an illustration of the structure of a coating layer in an exhaust gas purifying catalyst of Example 14 of the invention.

FIG. 15 illustrates a portion of the exhaust gas purifying catalyst of Example 14. The exhaust gas purifying catalyst of this example formed of a honeycomb-shaped monolithic base (not shown), and coating layers formed on surfaces of the monolithic base, as in Example 12. The coating layers are formed of the first powder 18 and the second powder 13 (substantially the same as the second powder in Example 12) and mordenite powder 19.

The first powder 18 is formed of zirconia, and supports Rh 20. The mordenite powder 19 supports no particular element. That is, the mordenite powder 19 is present at the interfaces between the first powder 18 and the second powder 13.

Preparation of First Powder 300 g of zirconia powder was mixed into a predetermined amount of rhodium nitrate of a predetermined concentration. After being stirred for a predetermined length of time, the mixture was filtered, and dried at 110° C. for 3 hours, and then baked at 400° C. for 1 hour, thereby supporting Rh in the powder. The amount of Rh supported was 1.5 g relative to 300 g of the zirconia powder.

Preparation of Catalyst

The entire amount of the first powder 18, the entire amount of the second powder 13 substantially the same as the second powder in Example 12, and 300 g of mordenite 203 powder were uniformly mixed, and water was added to form a slurry. A prepared monolithic base member substantially the same as in Example 12 was dipped into the slurry and then pulled up. After an extraneous amount of slurry was blown off, the monolithic base member was dried and baked, thereby forming coating layers. The exhaust gas purifying catalyst of Example 14 was thus prepared. The amount of slurry coating was 240 g relative to 1 liter of the monolithic base member.

EXAMPLE 15

Figure 16:
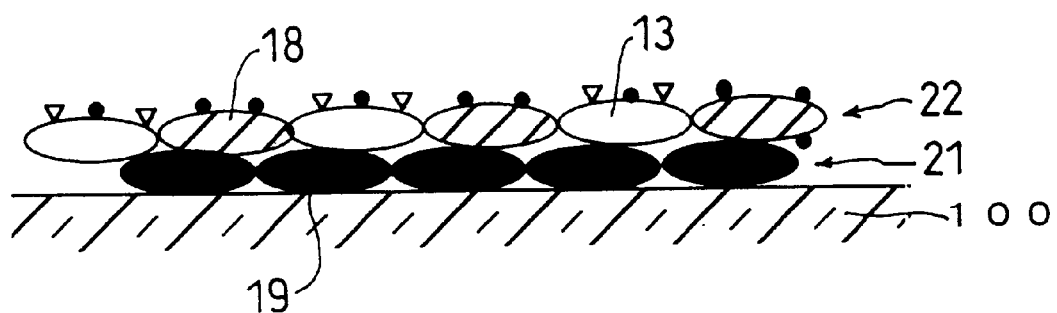
FIG. 16 is an illustration of the structure of an exhaust gas purifying catalyst of Example 15 of the invention.

FIG. 16 illustrates a portion of the exhaust gas purifying catalyst of Example 15. The exhaust gas purifying catalyst of this example formed of a monolithic base 100 substantially the same as in Example 12, and first coating layers 21 formed on surfaces of the monolithic base, and second coating layers 22 formed on surfaces of the first coating layers 21.

A first coating layer 21 is formed of mordenite powder 19. A second coating layer 22 is formed of the first powder 18 substantially the same as the first powder in Example 14 and the second powder 13 substantially the same as the second powder in Example 12. The first powder 18 and the second powder 13 are present in a mixed state.

Preparation of Catalyst

Using a prepared monolithic base member 100 substantially the same as in Example 12, the first coating layers 21 were formed substantially in the same manner as in Example 12, except that a slurry of mordenite 203 was used. The amount of the first coating layer 21 formed was 45 g relative to 1 liter of the monolithic base member.

The entire amount of the first powder 18 substantially the same as in Example 14 and the entire amount of the second powder 13 substantially the same as in Example 12 were uniformly mixed, and then water was added to form a slurry. The second coating layers 22 were formed on surface of the monolithic base member 100 carrying the first coating layers 21, substantially in the same manner as in Example 12. The amount of the second coating layer 22 formed was 195 g relative to 1 liter of the monolithic base member.

COMPARATIVE EXAMPLE 7

Figure 17:
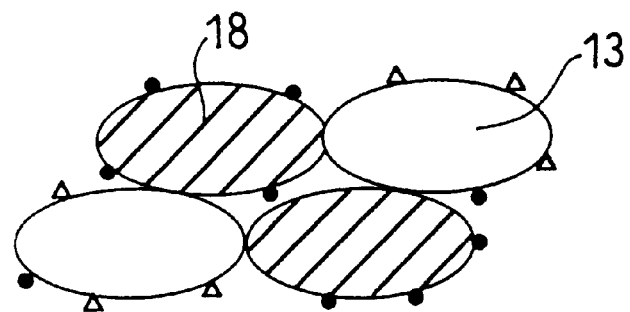
FIG. 17 is an illustration of the structure of a coating layer in an exhaust gas purifying catalyst of Comparative Example 7.

FIG. 17 illustrates a portion of the exhaust gas purifying catalyst of Comparative Example 7. The exhaust gas purifying catalyst of this comparative example is formed of a honeycomb-shaped monolithic base (not shown), and coating layers formed on surfaces of the monolithic base, as Example 12. The coating layers are formed of the first powder 18 substantially the same as the first layer in Example 14 and the second powder 13 substantially the same as the second layer in Example 12.

Preparation of Catalyst

The entire amount of the first powder 18 substantially the same as in Example 14 and the entire amount of the second powder 13 substantially the same as in Example 12 were uniformly mixed, and then water was added to form a slurry. A prepared monolithic base member substantially the same as in Example 12 was dipped into the slurry and then pulled up. After an extraneous amount of slurry was blown off, the monolithic base member was dried and baked, thereby forming coating layers. The exhaust gas purifying catalyst of Comparative Example 7 was thus prepared. The amount of slurry coating was 240 g relative to 1 liter of the monolithic base member.

EVALUATION TEST

Figure 18:
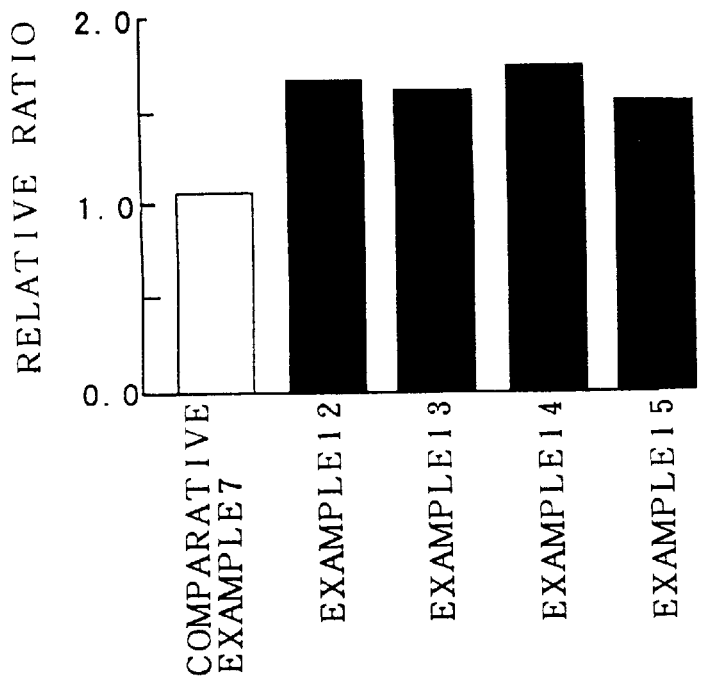
FIG. 18 is a bar chart indicating the relative ratios of the amount of NOx adsorbed by the catalysts of Examples 12–15 to that of Comparative Example 7.

An endurance test equivalent to 50,000 km driving was performed on the exhaust gas purifying catalysts of Examples 12–15 and Comparative Example 7, by setting each catalyst in the exhaust system of a 1.8-L lean burn gasoline engine. After the test, the amounts of NOx adsorbed were measured. Results are indicated in FIG. 18, on the basis of relative ratios to the amount in Comparative Example 7 being defined as 1.

Figure 19:
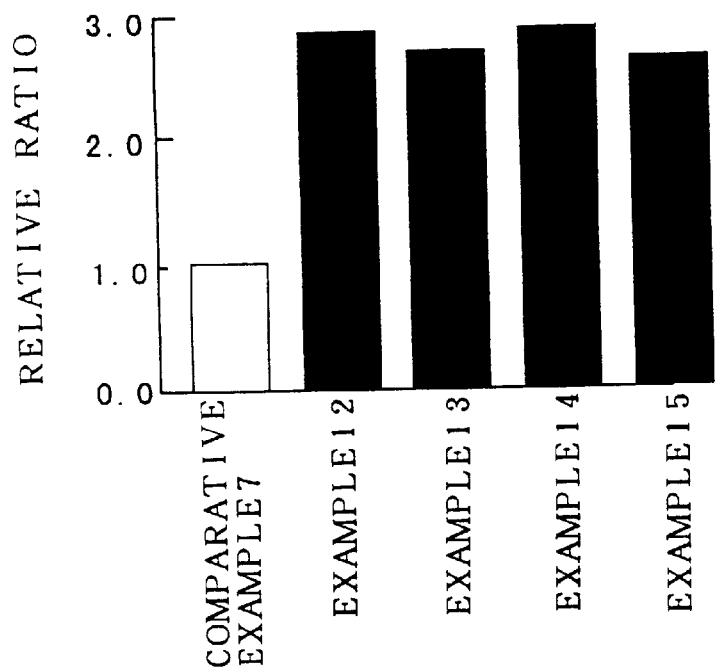
FIG. 19 is a bar chart indicating the relative ratios of the amounts of NOx reduced by th catalysts of Examples 12–15 to that of Comparative Example 7.
Figure 20:
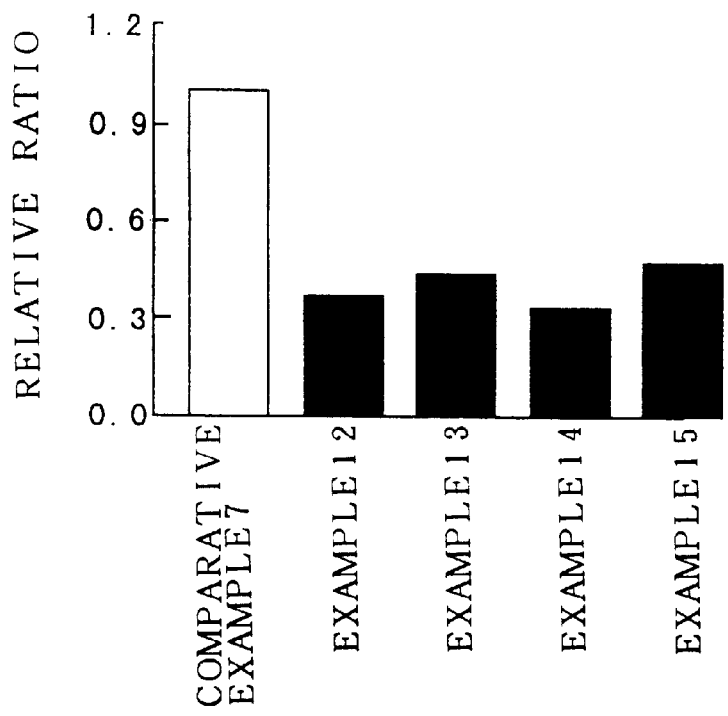
FIG. 20 is a bar chart indicating the relative ratios of the amount of sulfur-poisoning in conjunction with the catalysts of Examples 12–15 to the amount of sulfur-poisoning in conjunction with Comparative Example 7.

Each exhaust gas purifying catalyst was also set in the exhaust system of a 0.8-L lean burn gasoline engine. The engine was operated normally in a lean atmosphere of an air-fuel ratio of A/F=22, with 0.3-second rich pulses of a rich atmosphere of an air-fuel ratio of A/F=12 at intervals of 2 minutes. The amounts of NOx reduced in this test are indicated in FIG. 19, on the basis of relative ratios to the amount in Comparative Example 7 being defined as 1. The amounts of sulfur-poisoning that occurred in the test are indicated in FIG. 20, on the basis of relative ratios to the amount in Comparative Example 7 being defined as 1.

Figure 21:
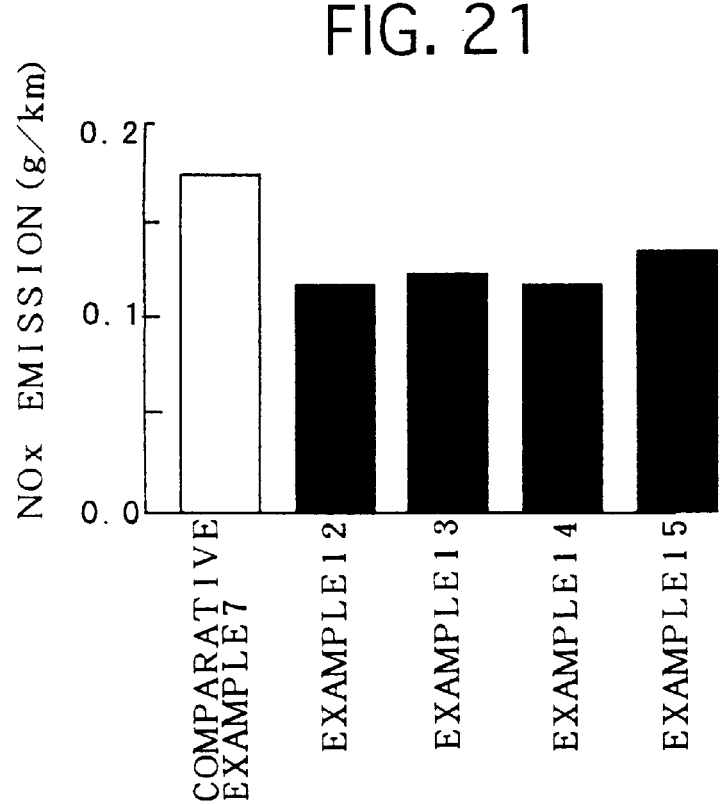
FIG. 21 is a bar chart indicating the relative ratios of the amounts of NOx emission in conjunction with the catalysts of Examples 12–15 to the amount of NOx emission in conjunction with Comparative Example 7.

Each exhaust gas purifying catalyst was also set in the exhaust system of a 1.8-L lean burn gasoline engine, and NOx emission during 10–15 mode operation was measured. Results are indicated in FIG. 21.

As is apparent from FIGS. 18–21, the exhaust gas purifying catalysts of Examples 12–15 exhibited higher NOx removing performance and allowed less sulfur-poisoning than Comparative Example 7. In the exhaust gas purifying catalyst of Comparative Example 7, removal of NOx was difficult due to substantially no hydrogen produced in the lean atmosphere, and the NOx adsorbing performance decreased due to considerable sulfur-poisoning. In the exhaust gas purifying catalysts of Examples 12–15, reduction of NOx and substantial prevention of sulfur-poisoning were achieved by hydrogen supplied even in the lean atmosphere, thereby exhibiting high NOx removing performance.

(5) Examples of Fifth Series

EXAMPLE 16

Figure 22:
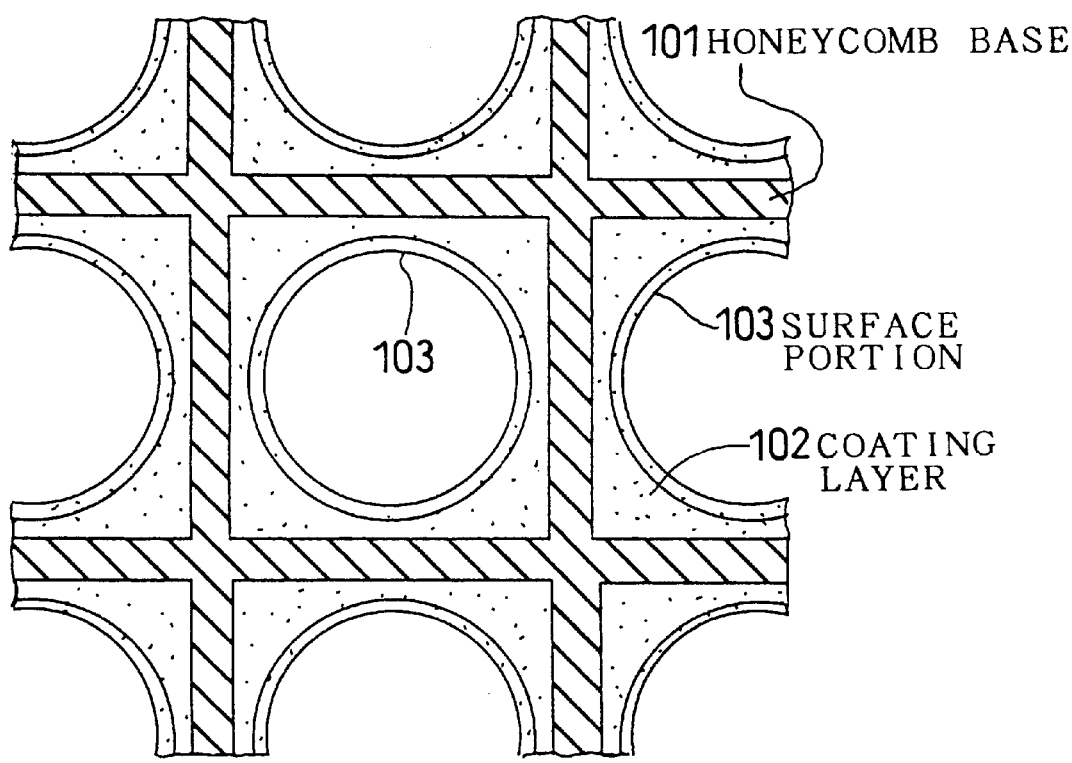
FIG. 22 is an illustration of the structure of a coating layer in an exhaust gas purifying catalyst of Examples 16 of the invention.
Figure 23:
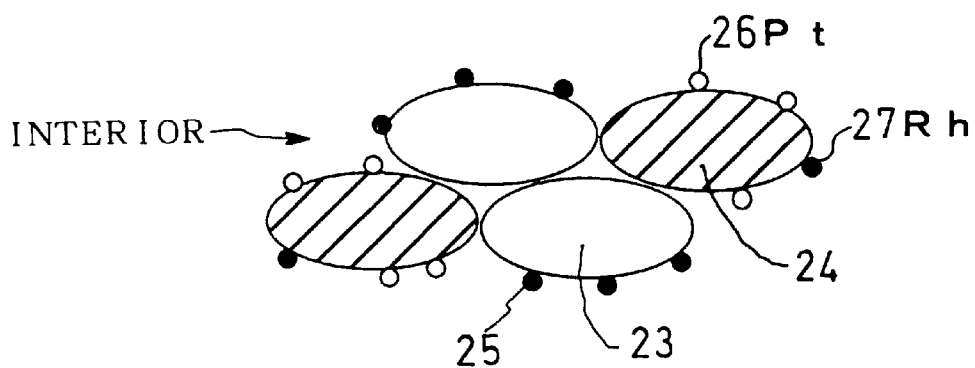
FIG. 23 illustrates the structure in an interior portion of a coating layer shown in FIG. 22.
Figure 24:
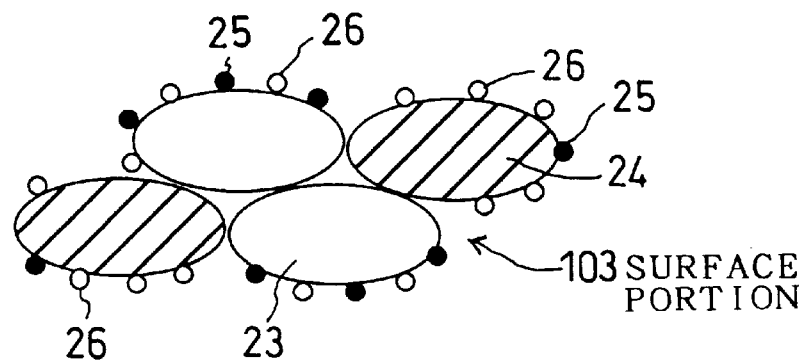
FIG. 24 illustrates the structure in a surface portion of the coating layer shown in FIG. 22.

FIGS. 22–24 illustrate an exhaust gas purifying catalyst of Example 16. The catalyst of this example is formed of a cordierite-formed honeycomb base 101, and coating layers 102 formed on surfaces of the honeycomb base 101. The coating layers 102 are formed of alumina zirconia.

In the coating layers 102, the first powder 23 formed of zirconia and the second powder 24 formed of alumina are present in a mixed state as shown in FIGS. 23 and 24. The second powder 24 supports Ba. In an interior portion of a coating layer 23 as shown in FIG. 23, particles of the first powder 23 only support Rh 25, and Pt 26 is not supported on the particles of the first powder 23. Particles of the second powder 24 supports Pt 26 and Rh 27.

In a surface portion 103 of a coating layer 102 as shown in FIG. 24, the structure is similar to the interior structure shown in FIG. 23, but a larger amount of Pt is supported on most particles of the first and second powders 23, 24. That is, the concentration of Pt supported is higher in the surface portion 103 than in the interior portion.

The method of producing the exhaust gas purifying catalyst will be described below. The structure of the exhaust gas purifying catalyst will.

Preparation of First Powder 480 g of zirconia powder was dipped into a rhodium nitrate aqueous solution of a predetermined concentration. After being filtered, the powder material was dried at 110° C. for 3 hours, and ground, and then baked at 400° C. for 1 hour, thereby supporting Rh in the powder. The amount of Rh supported was 2.0 g relative to 480 g of the zirconia powder. The first powder was thus prepared.

Preparation of Second Powder 480 g of 7-alumina powder was impregnated with a predetermined amount of a barium acetate aqueous solution of a predetermined concentration. The powder material was then dried at 110° C. for 3 hours while being stirred, thereby evaporating moisture. After being ground, the powder was baked at 500° C. for 3 hours, thereby supporting Ba in the powder. The amount of Ba supported was 1.6 moles relative to 480 g of the alumina powder.

Subsequently, the thus-obtained Ba-carrying alumina powder was dipped into 6 L of a 0.3-mol/L ammonium hydrogen carbonate aqueous solution. After being stirred for 15 minutes, the mixture was filtered, and dried at 110° C. for 3 hours, and then ground. Thereby, Ba was converted into barium carbonate and supported uniformly in the alumina powder.

The Ba/alumina powder was dipped into a dinitrodiammine platinum nitrate aqueous solution of a predetermined concentration. After being filtered, the powder material was dried at 110° C. for 3 hours, and then ground. Subsequently, the powder was dried at 400° C. for 2 hours, thereby supporting Pt in the powder. The amount of Pt supported was 6.4 g relative to 480 g of the alumina powder.

Subsequently, the obtained powder was dipped into a rhodium nitrate aqueous solution of a predetermined concentration. After being filtered, the powder material was dried at 110° C. for 3 hours, and then ground. Subsequently, the powder was dried at 400° C. for 2 hours, thereby supporting Rh in the powder. The amount of Rh supported was 0.32 g relative to 480 g of the alumina powder. The second powder was thus prepared.

Formation of Coating Layer

The entire amounts of the first powder and the second powder were uniformly mixed, and turned into a slurry by a standard method. A cordierite-formed honeycomb monolithic base member having a capacity of 1.3 L was dipped into the slurry and then pulled up. After an extraneous amount of the slurry was blown off, the monolithic base member was dried and baked, thereby forming coating layers. The amount of coating layers formed was 321.1 g relative to 1 L of the honeycomb base. The coating layers contained 120 g of zirconia as the first powder and 120 g of alumina as the second powder.

Supporting of Pt and Rh in Surface Portion

The thus-coated honeycomb base was dipped into a dinitrodiammine platinum nitrate aqueous solution of a predetermined concentration, and then pulled up. After an extraneous amount of the solution was blown off, the honeycomb base was dried at 110° C. for 3 hours. The honeycomb base was then dipped into a rhodium nitrate aqueous solution of a predetermined concentration, and pulled up. After an extraneous amount of the solution was blown off, the honeycomb base was dried at 110° C. for 3 hours, and then baked at 400° C. for 1 hour, thereby obtaining a catalyst of Example 16. Pt was supported in an amount of 0.52 g (0.4 g relative to 1 L of the honeycomb base). Rh was supported in an amount of 0.026 g (0.02 g relative 1 L of the honeycomb base). Both elements were supported in a surface portion of the coating layer.

EXAMPLE 17

Preparation of First Powder 480 g of zirconia powder was dipped into a rhodium nitrate aqueous solution of a predetermined concentration. After being filtered, the powder material was dried at 110° C. for 3 hours, and ground, and then baked at 400° C. for 1 hour, thereby supporting Rh in the powder. The amount of Rh supported was 2.0 g relative to 480 g of the zirconia powder. The first powder was thus prepared.

<Preparation of Second Powder>

480 g of γ-alumina powder was impregnated with a predetermined amount of a barium acetate aqueous solution of a predetermined concentration. The powder material was then dried at 110° C. for 3 hours while being stirred, thereby evaporating moisture. After being ground, the powder was baked at 500° C. for 3 hours, thereby supporting Ba in the powder. The amount of Ba supported was 1.6 moles relative to 480 g of the alumina powder.

Subsequently, the thus-obtained Ba-carrying alumina powder was dipped into 6 L of a 0.3-mol/L ammonium hydrogen carbonate aqueous solution. After being stirred for 15 minutes, the mixture was filtered, and dried at 110° C. for 3 hours, and then ground. Thereby, Ba was converted into barium carbonate and supported uniformly in the alumina powder.

The Ba/alumina powder was dipped into a dinitrodiammine platinum nitrate aqueous solution of a predetermined concentration. After being filtered, the powder material was dried at 110° C. for 3 hours, and then ground. Subsequently, the powder was dried at 400° C. and 2 hours, thereby supporting Pt in the powder. The amount of Pt supported was 4.0 g relative to 480 g of the alumina powder.

Subsequently, the obtained powder was dipped into a rhodium nitrate aqueous solution of a predetermined concentration. After being filtered, the powder material was dried at 110° C. for 3 hours, and then ground. Subsequently, the powder was dried at 400° C. for 2 hours, thereby supporting Rh in the powder. The amount of Rh supported was 0.2 g relative to 480 g of the alumina powder. The second powder was thus prepared.

<Formation of Coating Layer>

The entire amounts of the first powder and the second powder were uniformly mixed, and turned into a slurry by a standard method. A cordierite-formed honeycomb monolithic base member having a capacity of 1.3 L was dipped into the slurry and then pulled up. After an extraneous amount of the slurry was blown off, the monolithic base member was dried and baked, thereby forming coating layers. The amount of coating layers formed was 320.5 g relative to 1 L of the honeycomb base. The coating layers contained 120 g of zirconia as the first powder and 120 g of alumina as the second powder.

<Supporting of Pt and Rh in Surface Portion>

The thus-coated honeycomb base was dipped into a dinitrodiammine platinum nitrate aqueous solution of a predetermined concentration, and then pulled up. After an extraneous amount of the solution was blown off, the honeycomb base was dried at 110° C. for 3 hours. The honeycomb base was then dipped into a rhodium nitrate aqueous solution of a predetermined concentration, and pulled up. After an extraneous amount of the solution was blown off, the honeycomb base was dried at 110° C. for 3 hours, and then baked at 400° C. for 1 hour, thereby obtaining a catalyst of Example 17. Pt was supported in an amount of 1.3 g (1.0 g relative to 1 L of the honeycomb base). Rh was supported in an amount of 0.065 g (0.05 g relative to 1 L of the honeycomb base). Both elements were supported in a surface portion of the coating layer.

EXAMPLE 18

<Preparation of First Powder>

480 g of zirconia powder was dipped into a rhodium nitrate aqueous solution of a predetermined concentration. After being filtered, the powder material was dried at 110° C. for 3 hours, and ground, and then baked at 400° C. for 1 hour, thereby supporting Rh in the powder. The amount of Rh supported was 2.0 g relative to 480 g of the zirconia powder. The first powder was thus prepared.

<Preparation of Second Powder>

480 g of γ-alumina powder was impregnated with a predetermined amount of a barium acetate aqueous solution of a predetermined concentration. The powder material was then dried at 110° C. for 3 hours while being stirred, thereby evaporating moisture. After being ground, the powder was baked at 500° C. for 3 hours, thereby supporting Ba in the powder. The amount of Ba supported was 1.6 moles relative to 480 g of the alumina powder.

Subsequently, the thus-obtained Ba-carrying alumina powder was dipped into 6 L of a 0.3-mol/L ammonium hydrogen carbonate aqueous solution. After being stirred for 15 minutes, the mixture was filtered, and dried at 110° C. for 3 hours, and then ground. Thereby, Ba was converted into barium carbonate and supported uniformly in the alumina powder.

The Ba/alumina powder was dipped into a dinitrodiammine platinum nitrate aqueous solution of a predetermined concentration. After being filtered, the powder material was dried at 110° C. for 3 hours, and then ground. Subsequently, the powder was dried at 400° C. for 2 hours, thereby supporting Pt in the powder. The amount of Pt supported was 1.6 g relative to 480 g of the alumina powder.

Subsequently, the obtained powder was dipped into a rhodium nitrate aqueous solution of a predetermined concentration. After being filtered, the powder material was dried at 110° C. for 3 hours, and then ground. Subsequently, the powder was dried at 400° C. for 2 hours, thereby supporting Rh in the powder. The amount of Rh supported was 0.08 g relative to 480 g of the alumina powder. The second powder was thus prepared.

<Formation of Coating Layer>

The entire amounts of the first powder and the second powder were uniformly mixed, and turned into a slurry by the standard method. A cordierite-formed honeycomb monolithic base member having a capacity of 1.3 L was dipped into the slurry and then pulled up. After an extraneous amount of the slurry was blown off, the monolithic base member was dried and baked, thereby forming coating layers. The amount of coating layers formed was 319.7 g relative to 1 L of the honeycomb base. The coating layers contained 120 g of zirconia as the first powder and 120 g of alumina as the second powder.

<Supporting of Pt and Rh in Surface Portion>

The thus-coated honeycomb base was dipped into a dinitrodiammine platinum nitrate aqueous solution of a predetermined concentration, and then pulled up. After an extraneous amount of the solution was blown off, the honeycomb base was dried at 110° C. for 3 hours. The honeycomb base was then dipped into a rhodium nitrate aqueous solution of a predetermined concentration, and pulled up. After an extraneous amount of the solution was blown off, the honeycomb base was dried at 110° C. for 3 hours, and then baked at 400° C. for 1 hour, thereby obtaining a catalyst of Example 18. Pt was supported in an amount of 2.08 g (1.6 g relative to 1 L of the honeycomb base). Rh was supported in an amount of 0.104 g (0.08 g relative to 1 L of the honeycomb base). Both elements were supported in a surface portion of the coating layer.

EXAMPLE 19

<Preparation of First Powder>

480 g of zirconia powder was dipped into a rhodium nitrate aqueous solution of a predetermined concentration. After being filtered, the powder material was dried at 110° C. for 3 hours, and ground, and then baked at 400° C. for 1 hour, thereby supporting Rh in the powder. The amount of Rh supported was 2.0 g relative to 480 g of the zirconia powder. The first powder was thus prepared.

<Preparation of Second Powder>

480 g of γ-alumina powder was impregnated with a predetermined amount of a barium acetate aqueous solution of a predetermined concentration. The powder material was then dried at 110° C. for 3 hours while being stirred, thereby evaporating moisture. After being ground, the powder was baked at 500° C. for 3 hours, thereby supporting Ba in the powder. The amount of Ba supported was 1.6 moles relative to 480 g of the alumina powder.

Subsequently, the thus-obtained Ba-carrying alumina powder was dipped into 6 L of a 0.3-mol/L ammonium hydrogen carbonate aqueous solution. After being stirred for 15 minutes, the mixture was filtered, and dried at 110° C. for 3 hours, and then ground. Thereby, Ba was converted into barium carbonate and supported uniformly in the alumina powder.

<Formation of Coating Layer>

The entire amounts of the first powder and the second powder were uniformly mixed, and turned into a slurry by the standard method. A cordierite-formed honeycomb monolithic base member having a capacity of 1.3 L was dipped into the slurry and then pulled up. After an extraneous amount of the slurry was blown off, the monolithic base member was dried and baked, thereby forming coating layers. The amount of coating layers formed was 319.3 g relative to 1 L of the honeycomb base. The coating layers contained 120 g of zirconia as the first powder and 120 g of alumina as the second powder.

<Supporting of Pt and Rh in Surface Portion>

The thus-coated honeycomb base was dipped into a dinitrodiammine platinum nitrate aqueous solution of a predetermined concentration, and then pulled up. After an extraneous amount of the solution was blown off, the honeycomb base was dried at 110° C. for 3 hours. The honeycomb base was then dipped into a rhodium nitrate aqueous solution of a predetermined concentration, and pulled up. After an extraneous amount of the solution was blown off, the honeycomb base was dried at 110° C. for 3 hours, and then baked at 400° C. for 1 hour, thereby obtaining a catalyst of Example 19. Pt was supported in an amount of 2.6 g (2.0 g relative to 1 L of the Honeycomb base). Rh was supported in an amount of 0.13 g (0.1 g relative to 1 L of the honeycomb base). Both elements were supported in a surface portion of the coating layer.

EXAMPLE 20

<Preparation of First Powder>

480 g of zirconia powder was dipped into a rhodium nitrate aqueous solution of a predetermined concentration. After being filtered, the powder material was dried at 110° C. for 3 hours, and ground, and then baked at 400° C. for 1 hour, thereby supporting Rh in the powder. The amount of Rh supported was 2.0 g relative to 480 g of the zirconia powder. The first powder was thus prepared.

<Preparation of Second Powder>

A mixture of 480 g of γ-alumina powder and 120 g of titania powder was impregnated with a predetermined amount of a barium acetate aqueous solution of a predetermined concentration. The powder material was then dried at 110° C. for 3 hours while being stirred, thereby evaporating moisture. After being ground, the powder was baked at 500°

C. for 3 hours, thereby supporting Ba in the powder. The amount of Ba supported was 1.6 moles relative to 600 g of the powder combining 480 g of the alumina powder and 120 g of the titania.

The thus-obtained powder was dipped into 6 L of a 0.3-mol/L ammonium hydrogen carbonate aqueous solution. After being stirred for 15 minutes, the mixture was filtered, and dried at 110° C. for 3 hours, and then ground. Thereby, Ba was converted into barium carbonate and supported uniformly in the alumina powder and the titania.

The Ba-carrying alumina-titania powder was dipped into a dinitrodiammine platinum nitrate aqueous solution of a predetermined concentration. After being filtered, the powder material was dried at 100° C. for 3 hours, and then ground. Subsequently, the powder was dried at 400° C. for 2 hours, thereby supporting Pt in the powder. The amount of Pt supported was 4.0 g relative to 600 g of the powder combining 480 g of the alumina powder and 120 of the titania powder.

Subsequently, the obtained powder was dipped into a rhodium nitrate aqueous solution of a predetermined concentration. After being filtered, the powder material was dried at 110° C. for 3 hours, and then ground. Subsequently, the powder was dried at 400° C. for 2 hours, thereby supporting Rh in the powder. The amount of Rh supported was 0.2 g relative to 600 g of the powder combining 480 g of the alumina powder. The second powder was thus prepared.

<Formation of Coating Layer>

The entire amounts of the first powder and the second powder were uniformly mixed, and turned into a slurry by the standard method. A cordierite-formed honeycomb monolithic base member having a capacity of 1.3 L was dipped into the slurry and then pulled up. After an extraneous amount of the slurry was blown off, the monolithic base member was dried and baked, thereby forming coating layers. The amount of coating layers formed was 319.3 g relative to 1 L of the honeycomb base. The coating layers contained 96 g of zirconia as the first powder and 144 g of alumina as the second powder.

<Supporting of Pt and Rh in Surface Portion>

The thus-coated honeycomb base was dipped into a dinitrodiammine platinum nitrate aqueous solution of a predetermined concentration, and then pulled up. After an extraneous amount of the solution was blown off, the honeycomb base was dried at 110° C. for 3 hours. The honeycomb base was then dipped into a rhodium nitrate aqueous solution of a predetermined concentration, and pulled up. After an extraneous amount of the solution was blown off, the honeycomb base was dried at 110° C. for 3 hours, and then baked at 400° C. for 1 hour, thereby obtaining a catalyst of Example 20. Pt was supported in an amount of 1.3 g (1.0 g relative to 1 L of the Honeycomb base). Rh was supported in an amount of 0.065 g (0.5 g relative to 1 L of the honeycomb base). Both elements were supported in a surface portion of the coating layer.

EXAMPLE 21

<Preparation of First Powder>

480 g of zirconia powder was dipped into a rhodium nitrate aqueous solution of a predetermined concentration. After being filtered, the powder material was dried at 110° C. for 3 hours, and ground, and then baked at 400° C. for 1 hour, thereby supporting Rh in the powder. The amount of Rh supported was 2.0 g relative to 480 g of the zirconia powder. The first powder was thus prepared.

<Preparation of Second Powder>

A mixture of 480 g of γ-alumina powder and 120 g of titania powder was impregnated with a predetermined amount of a barium acetate aqueous solution of a predetermined concentration. The powder material was then dried at 110° C. for 3 hours while being stirred, thereby evaporating moisture. After being ground, the powder was baked at 500° C. for 3 hours, thereby supporting Ba in the powder. The amount of Ba supported was 1.6 moles relative to 600 g of the powder combining 480 g of the alumina powder and 120 g of the titania.

The thus-obtained powder was dipped into 6 L of a 0.3-mol/L ammonium hydrogen carbonate aqueous solution. After being stirred for 15 minutes, the mixture was filtered, and dried at 110° C. for 3 hours, and then ground. Thereby, Ba was converted into barium carbonate and supported uniformly in the alumina powder and the titania.

The Ba-carrying alumina-titania powder was dipped into a dinitrodiammine platinum nitrate aqueous solution of a predetermined concentration. After being filtered, the powder material was dried at 100° C. for 3 hours, and then ground. Subsequently, the powder was dried at 400° C. for 2 hours, thereby supporting Pt in the powder. The amount of Pt supported was 4.0 g relative to 600 g of the powder combining 480 g of the alumina powder and 120 of the titania powder.

Subsequently, the obtained powder was dipped into a rhodium nitrate aqueous solution of a predetermined concentration. After being filtered, the powder material was dried at 110° C. for 3 hours, and then ground. Subsequently, the powder was dried at 400° C. for 2 hours, thereby supporting Rh in the powder. The amount of Rh supported was 0.2 g relative to 600 g of the powder combining 480 g of the alumina powder and 120 of the titania powder. The second powder was thus prepared.

<Formation of Coating Layer>

The entire amounts of the first powder and the second powder were uniformly mixed, and turned into a slurry by the standard method. A cordierite-formed honeycomb monolithic base member having a capacity of 1.3 L was dipped into the slurry and then pulled up. After an extraneous amount of the slurry was blown off, the monolithic base member was dried and baked, thereby forming coating layers. The amount of coating layers formed was 319.3 g relative to 1 L of the honeycomb base. The coating layers contained zirconia as the first powder and 96 g of alumina as the second powder in a total amount of 144 g.

<Supporting of Pt and Rh, K and Li in Surface Portion>

The thus-coated honeycomb base was dipped into a dinitrodiammine platinum nitrate aqueous solution of a predetermined concentration, and then pulled up. After an extraneous amount of the solution was blown off, the honeycomb base was dried at 110° C. for 3 hours. The honeycomb base was then dipped into a rhodium nitrate aqueous solution of a predetermined concentration, and pulled up. After an extraneous amount of the solution was blown off, the honeycomb base was dried at 110° C. for 3 hours, and then baked at 400° C. for 1 hour.

Subsequently, the honeycomb base was dipped into a potassium acetate aqueous solution of a predetermined amount, and pulled up. After an extraneous amount of the solution was blown off, the honeycomb base was dried at 110° C. for 3 hours. The honeycomb base was then dipped into a lithium nitrate aqueous solution of a predetermined concentration, and pulled up. After an extraneous amount of the solution was blown off, the honeycomb base was dried at 110° C. for 3 hours, and then baked at 500° C. for 1 hour, thereby obtaining a catalyst of Example 21. Pt was supported in an amount of 1.3 g (1.0 g relative to 1 L of the honeycomb base). Rh was supported in an amount of 0.065 g (0.05 g relative to 1 L of the honeycomb base). Each of potassium (K) and lithium (Li) was supported in an amount of 0.13 mol (0.1 mole relative to 1 L of the honeycomb base). These elements were supported in a surface portion of the coating layer.

EXAMPLE 22

<Preparation of First Powder>

384 g of barium-stabilized zirconia powder (containing 1 mol % Ba) was dipped into a rhodium nitrate aqueous solution of a predetermined concentration. After being filtered, the powder material was dried at 110° C. for 3 hours, and ground, and then baked at 400° C. for 1 hour, thereby supporting Rh in the powder. The amount of Rh supported was 2.0 g relative to 384 g of the zirconia powder. The first powder was thus prepared.

<Preparation of Second Powder>

A mixture of 480 g of γ-alumina powder and 120 g of titania powder was impregnated with a predetermined amount of a barium acetate aqueous solution of a predetermined concentration. The powder material was then dried at 110° C. for 3 hours while being stirred, thereby evaporating moisture. After being ground, the powder was baked at 500° C. for 3 hours, thereby supporting Ba in the powder. The amount of Ba supported was 1.6 moles relative to 600 g of the powder combining 480 g of the alumina powder and 120 g of the titania.

The thus-obtained powder was dipped into 6 L of a 0.3-mol/L ammonium hydrogen carbonate aqueous solution. After being stirred for 15 minutes, the mixture was filtered, and dried at 110° C. for 3 hours, and then ground. Thereby, Ba was converted into barium carbonate and supported uniformly in the alumina powder and the titania.

The Ba-carrying alumina-titania powder was dipped into a dinitrodiammine platinum nitrate aqueous solution of a predetermined concentration. After being filtered, the powder material was dried at 110° C. for 3 hours, and then ground. Subsequently, the powder was dried at 400° C. for 2 hours, thereby supporting Pt in the powder. The amount of Pt supported was 4.0 g relative to 600 g of the powder combining 480 g of the alumina powder and 120 of the titania powder.

Subsequently, the obtained powder was dipped into a rhodium nitrate aqueous solution of a predetermined concentration. After being filtered, the powder material was dried at 110° C. for 3 hours, and then ground. Subsequently, the powder was dried at 400° C. for 2 hours, thereby supporting Rh in the powder. The amount of Rh supported was 0.2 g relative to 600 g of the powder combining 480 g of the alumina powder. The second powder was thus prepared.

<Formation of Coating Layer>

The entire amounts of the first powder and the second powder were uniformly mixed, and turned into a slurry by the standard method. A cordierite-formed honeycomb monolithic base member having a capacity of 1.3 L was dipped into the slurry and then pulled up. After an extraneous amount of the slurry was blown off, the monolithic base member was dried and baked, thereby forming coating layers. The amount of coating layers formed was 319.3 g relative to 1 L of the honeycomb base. The coating layers contained zirconia as the first powder and 96 g of alumina as the second powder in a total amount of 144 g.

<Supporting of Pt and Rh, K and Li in Surface Portion>

The thus-coated honeycomb base was dipped into a dinitrodiammine platinum nitrate aqueous solution of a predetermined concentration, and then pulled up. After an extraneous amount of the solution was blown off, the honeycomb base was dried at 110° C. for 3 hours. The honeycomb base was then dipped into a rhodium nitrate aqueous solution of a predetermined concentration, and pulled up. After an extraneous amount of the solution was blown off, the honeycomb base was dried at 110° C. for 3 hours, and then baked at 400° C. for 1 hour.

Subsequently, the honeycomb base was dipped into a potassium acetate aqueous solution of a predetermined amount, and pulled up. After an extraneous amount of the solution was blown off, the honeycomb base was dried at 110° C. for 3 hours. The honeycomb base was then dipped into a lithium nitrate aqueous solution of a predetermined concentration, and pulled up. After an extraneous amount of the solution was blown off, the honeycomb base was dried at 110° C. for 3 hours, and then baked at 500° C. for 1 hour, thereby obtaining a catalyst of Example 22. Pt was supported in an amount of 1.3 g (1.0 g relative to 1 L of the honeycomb base). Rh was supported in an amount of 0.065 g (0.05 g relative to 1 L of the honeycomb base). Each of K and Li was supported in an amount of 0.13 mol (0.1 mole relative to 1 L of the honeycomb base). These elements were supported in a surface portion of the coating layer.

Comparative Example 8

γ-Alumina was turned into a slurry by the standard method. A cordierite-formed honeycomb monolithic base member having a capacity of 1.3 L was dipped into the slurry and then pulled up. After an extraneous amount of the slurry was blown off, the monolithic base member was dried and baked, thereby forming coating layers. The amount of coating layers formed was 240.0 g relative to 1 L of the honeycomb base.

The thus-coated honeycomb base was dipped into a barium acetate aqueous solution of a predetermined concentration, and then pulled up. After an extraneous amount of the solution was blown off, the honeycomb base was baked at 500° C. for 3 hours, thereby supporting 0.4 mole of Ba. After that, the honeycomb base was entirely dipped into 2 L of a 0.3-mol/L ammonium hydrogen carbonate aqueous solution. The solution was stirred for 15 minutes followed by filtration. The honeycomb base was then dried at 110° C. for 3 hours, and ground. Ba was thereby converted into barium carbonate and supported uniformly on surfaces of the alumina coating layers.

The honeycomb base having alumina coating layers carrying barium carbonate was dipped into a dinitrodiammine platinum nitrate aqueous solution of a predetermined concentration, and then pulled up. After an extraneous amount of the solution was blown off, the honeycomb base was dried at 110° C. for 3 hours. The honeycomb base was then dipped into a rhodium nitrate aqueous solution of a predetermined concentration, and pulled up. After an extraneous amount of the solution was blown off, the honeycomb bas was dried at 110° C. for 3 hours, and then baked at 400° C. for 1 hour, thereby obtaining a catalyst of Comparative Example 8. Pt was supported in an amount of 2.6 g (2.0 g relative to 1 L of the honeycomb base). Rh was supported in an amount of 0.78 g (0.6 g relative to 1 L of the honeycomb base). Both elements were supported in a surface portion of the coating layer.

Comparative Example 9

After 240 g of γ-alumina and 240 g of zirconia powder were thoroughly mixed, the mixture was turned into a slurry by the standard method. A cordierite-formed honeycomb monolithic base member having a capacity of 1.3 L was dipped into the slurry and then pulled up. After an extraneous amount of the slurry was blown off, the monolithic base member was dried and baked, thereby forming coating layers. The amount of coating layers formed was 240.0 g relative to 1 L of the honeycomb base.

The thus-coated honeycomb base was dipped into a barium acetate aqueous solution of a predetermined concentration, and then pulled up. After an extraneous amount of the solution was blown off, the honeycomb base was baked at 500° C. for 3 hours, thereby supporting 0.4 mole of Ba. After that, the honeycomb base was entirely dipped into 2 L of a 0.3-mol/L ammonium hydrogen carbonate aqueous solution. The solution was stirred for 15 minutes followed by filtration. The honeycomb base was then dried at 110° C. for 3 hours, and ground. Ba was thereby converted into barium carbonate and supported uniformly on surfaces of the alumina/zirconia coating layers.

The honeycomb base having alumina coating layers carrying barium carbonate was dipped into a dinitrodiammine platinum nitrate aqueous solution of a predetermined concentration, and then pulled up. After an extraneous amount of the solution was blown off, the honeycomb base was dried at 110° C. for 3 hours. The honeycomb base was then dipped into a rhodium nitrate aqueous solution of a predetermined concentration, and pulled up. After an extraneous amount of the solution was blown off, the honeycomb bas was dried at 110° C. for 3 hours, and then baked at 400° C. for 1 hour, thereby obtaining a catalyst of Comparative Example 9. Pt was supported in an amount of 2.6 g (2.0 g relative to 1 L of the honeycomb base). Rh was supported in an amount of 0.78 g (0.6 g relative to 1 L of the honeycomb base). Both elements were supported in a surface portion of the coating layer.

Comparative Example 10

After 240 g of γ-alumina and 192 g of zirconia powder and 48 g of titania powder were thoroughly mixed, the mixture was turned into a slurry by the standard method. A cordierite-formed honeycomb monolithic base member having a capacity of 1.3 L was dipped into the slurry and then pulled up. After an extraneous amount of the slurry was blown off, the monolithic base member was dried and baked, thereby forming coating layers. The amount of coating layers formed was 240.0 g relative to 1 L of the honeycomb base.

The thus-coated honeycomb base was dipped into a barium acetate aqueous solution of a predetermined concentration, and then pulled up. After an extraneous amount of the solution was blown off, the honeycomb base was baked at 500° C. for 3 hours, thereby supporting 0.4 mole of Ba. After that, the honeycomb base was entirely dipped into 2 L of a 0.3-mol/L ammonium hydrogen carbonate aqueous solution. The solution was stirred for 15 minutes followed by filtration. The honeycomb base was then dried at 110° C. for 3 hours, and ground. Ba was thereby converted into barium carbonate and supported uniformly on surfaces of the alumina coating layers.

The honeycomb base having alumina/zirconia/titania coating layers carrying barium carbonate was dipped into a dinitrodiammine platinum nitrate aqueous solution of a predetermined concentration, and then pulled up. After an extraneous amount of the solution was blown off, the honeycomb base was dried at 110° C. for 3 hours. The honeycomb base was then dipped into a rhodium nitrate aqueous solution of a predetermined concentration, and pulled up. After an extraneous amount of the solution was blown off, the honeycomb bas was dried at 110° C. for 3 hours, and then baked at 400° C. for 1 hour, thereby obtaining a catalyst of Comparative Example 10. Pt was supported in an amount of 2.6 g (2.0 g relative to 1 L of the honeycomb base). Rh was supported in an amount of 0.78 g (0.6 g relative to 1 L of the honeycomb base). Both elements were supported in a surface portion of the coating layer.

Comparative Example 11

After 240 g of γ-alumina and 192 g of zirconia powder and 48 g of titania powder were thoroughly mixed, the mixture was turned into a slurry by the standard method. A cordierite-formed honeycomb monolithic base member having a capacity of 1.3 L was dipped into the slurry and then pulled up. After an extraneous amount of the slurry was blown off, the monolithic base member was dried and baked, thereby forming coating layers. The amount of coating layers formed was 240.0 g relative to 1 L of the honeycomb base.

The thus-coated honeycomb base was dipped into a barium acetate aqueous solution of a predetermined concentration, and then pulled up. After an extraneous amount of the solution was blown off, the honeycomb base was baked at 500° C. for 3 hours, thereby supporting 0.4 mole of Ba. After that, the honeycomb base was entirely dipped into 2 L of a 0.3-mol/L ammonium hydrogen carbonate aqueous solution. The solution was stirred for 15 minutes followed by filtration. The honeycomb base was then dried at 110° C. for 3 hours, and ground. Ba was thereby converted into barium carbonate and supported uniformly on surfaces of the alumina/zirconia/titania coating layers.

The honeycomb base having alumina/zirconia/titania coating layers carrying barium carbonate was dipped into a dinitrodiammine platinum nitrate aqueous solution of a predetermined concentration, and then pulled up. After an extraneous amount of the solution was blown off, the honeycomb base was dried at 110° C. for 3 hours. The honeycomb base was then dipped into a rhodium nitrate aqueous solution of a predetermined concentration, and pulled up. After an extraneous amount of the solution was blown off, the honeycomb bas was dried at 110° C. for 3 hours, and then baked at 400° C. for 1 hour. Pt was supported in an amount of 2.6 g (2.0 g relative to 1 L of the honeycomb base). Rh was supported in an amount of 0.78 g (0.6 g relative to 1 L of the honeycomb base). Both elements were supported in a surface portion of the coating layer.

Subsequently, the honeycomb base was dipped into a potassium acetate aqueous solution of a predetermined amount, and pulled up. After an extraneous amount of the solution was blown off, the honeycomb base was dried at 110° C. for 3 hours. The honeycomb base was then dipped into a lithium nitrate aqueous solution of a predetermined concentration, and pulled up. After an extraneous amount of the solution was blown off, the honeycomb base was dried at 110° C. for 3 hours, and then baked at 500° C. for 1 hour, thereby obtaining a catalyst of Comparative Example 11. Each of potassium (K) and lithium (Li) was supported in an amount of 0.13 mol (0.1 mole relative to 1 L of the honeycomb base).

EXAMPLE 23

<Preparation of First Powder>

480 g of γ-alumina powder was impregnated with a predetermined amount of a barium acetate aqueous solution of a predetermined concentration. The powder material was then dried at 110° C. for 3 hours while being stirred, thereby evaporating moisture. After being ground, the powder was baked at 500° C. for 3 hours, thereby supporting Ba in the powder. The amount of Ba supported was 1.6 moles relative to 480 g of the alumina powder.

Subsequently, the thus-obtained powder was dipped into 6 L of a 0.3-mol/L ammonium hydrogen carbonate aqueous solution. After being stirred for 15 minutes, the mixture was filtered, and dried at 110° C. for 3 hours, and then ground. Thereby, Ba was converted into barium carbonate and supported uniformly in the alumina powder.

The Ba/alumina powder was then dipped into a dinitrodiammine platinum nitrate aqueous solution of a predetermined concentration. After being filtered, the powder material was dried at 110° C. for 3 hours, and then ground. Subsequently, the powder was dried at 400° C. for 2 hours, thereby supporting Pt in the powder. The amount of Pt supported was 8.0 g relative to 480 g of the alumina powder.

Subsequently, the obtained powder was dipped into a rhodium nitrate aqueous solution of a predetermined concentration. After being filtered, the powder material was dried at 110° C. for 3 hours, and the ground. Subsequently, the powder was dried at 400° C. for 2 hours, thereby supporting Rh in the powder. The amount of Rh supported was 0.4 g relative to 480 g of the alumina powder. The second powder was thus prepared.

<Formation of Coating Layer>

The entire amounts of the first powder and the second powder were uniformly mixed, and turned into a slurry by the standard method. A cordierite-formed honeycomb monolithic base member having a capacity of 1.3 L was dipped into the slurry and then pulled up. After an extraneous amount of the slurry was blown off, the monolithic base member was dried and baked, thereby forming coating layers. The amount of coating layers formed was 321.1 g relative to 1 L of the honeycomb base. The coating layers contained 120 g of zirconia as the first powder and 120 g of alumina as the second powder.

<Evaluation Test>

An endurance test equivalent to 50,000 km driving was performed on the exhaust gas purifying catalysts of Examples 16–23 and Comparative Examples 8–11, by setting each catalyst in the exhaust system of a 1.8-L lean burn gasoline engine. After the test, the amounts of NOx adsorbed at an in-coming gas temperature of 400° C. during lean burn operation, the amounts of NOx reduced at an in-coming gas temperature of 400° C. during rich pulses, 50%-HC removal temperatures, and NOx emissions during 10–15 mode operation were measured in the same exhaust system. Results are shown in Table 6.

TABLE 6

| | First Powder | | | | Second Powder | | Surface Portion Enhancement | | | Removing Performance After Endurance | | | |
|---|---|---|---|---|---|---|---|---|---|---|---|---|---|
| | Carrier | Supported Metal g/L, mol/L | | | Carrier | Supported Metal g/L | Supported Metal g/L, mol/L | | | NOx adsorbed | NOx reduced | 50%-HC removal | NOx emission |
| 16 | Alumina | Pt, 1.6, | Rh, 0.08, | Ba, 0.4 | Zirconia | Rh 0.5 | Pt, 0.4, | Rh, 0.02 | | 271 mg | 224 mg | 274° C. | 0.134 g/km |
| 17 | Alumina | Pt, 1.0, | Rh, 0.05, | Ba 0.4 | Zirconia | Rh 0.5 | Pt, 1.0, | Rh, 0.05 | | 292 mg | 251 mg | 278° C. | 0.125 g/km |
| 18 | Alumina | Pt, 0.4, | Rh, 0.02, | Ba 0.4 | Zirconia | Rh 0.5 | Pt, 1.6, | Rh, 0.08 | | 294 mg | 255 mg | 281° C. | 0.126 g/km |
| 19 | Alumina | | | Ba 0.4 | Zirconia | Rh 0.5 | Pt, 2.0, | Rh, 0.1 | | 292 mg | 251 mg | 278° C. | 0.125 g/km |
| 20 | Alumina + Titania | Pt, 1.0, | Rh, 0.05, | Ba 0.4 | Zirconia | Rh 0.5 | Pt, 1.0, | Rh, 0.05 | | 310 mg | 268 mg | 287° C. | 0.116 g/km |
| 21 | Alumina + Titania | Pt, 1.0, | Rh, 0.05, | Ba 0.4 | Zirconia | Rh 0.5 | Pt, 1.0, | Rh, 0.05, | K, 0.1, | Li 0.1 | 353 mg | 301 mg | 293° C. | 0.108 g/km |
| 22 | Alumina + Titania | Pt, 1.0, | Rh, 0.05, | Ba 0.4 | Ba-Zirconia | Rh 0.5 | Pt, 1.0, | Rh, 0.05, | K, 0.1, | Li 0.1 | 342 mg | 293 mg | 287° C. | 0.111 g/km |
| 23 | Alumina | Pt, 2.0, | Rh, 0.1, | Ba 0.4 | Zirconia | Rh 0.5 | — | | | 257 mg | 198 mg | 270° C. | 0.139 g/km |
| 8 | Alumina | Pt, 2.0, | Rh, 0.6, | Ba 0.4 | — | — | — | | | 181 mg | 72 mg | 310° C. | 0.188 g/km |
| 9 | Alumina + Zirconia | Pt, 2.0, | Rh, 0.6, | Ba 0.4 | — | — | — | | | 221 mg | 91 mg | 314° C. | 0.168 g/km |
| 10 | Alumina + Zirconia + Titania | Pt, 2.0, | Rh, 0.6, | Ba 0.4 | — | — | — | | | 237 mg | 101 mg | 321° C. | 0.142 g/km |
| 11 | Alumina + Zirconia + Titania | Pt, 2.0, | Rh, 0.6, | Ba, 0.4, | K, 0.1, | Li 0.1 | — | — | — | 249 mg | 107 mg | 330° C. | 0.142 g/km |

As can be seen from Table 6, the catalyst of Example 23 exhibited a larger amount of NOx adsorbed and a larger amount of NOx reduced than the catalyst of Comparative Examples 8–11. The catalyst of Example 23 was also excellent in the NOx removing performance at the time of rich pulses even after the endurance. Therefore, it should be clear that the supporting Rh and Ba apart from each other as in Example 23, the NOx removing performance significantly improves.

The catalysts of Examples 16–22 of the invention achieved even higher NOx removing performance than the catalyst of Example 23. This is apparently because of portion of Pt was supported in a surface portion of the coating layers in each of Examples 16–22.

As understood from the above description, the exhaust gas purifying catalyst of the invention achieves high NOx removing performance both during an initial period and after the endurance test and, therefore, has high durability.

If the exhaust gas purifying method of the invention is employed, production of NOx by oxidation of NO, adsorption of NOx to the NOx adsorbent, and reduction of NOx released from the NOx adsorbent smoothly progress. Therefore, it becomes possible to reliably maintain high NOx removing performance not only during an initial period but also after the endurance test.

Furthermore, if at least one element selected from Co, Fe and Ni is optionally supported, the sulfur-poisoning of the NOx adsorbent is further reduced, so that durability is further enhanced. Further, if the catalyst is formed so that the concentration of Pt supported is higher in a surface portion than in an interior portion, the NOx removing performance further improves.

While the present invention has been described with reference to what are presently considered to be preferred embodiments thereof, it is to be understood that the invention is not limited to the disclosed embodiments, examples or constructions. To the contrary, the invention is intended to cover various modifications and equivalent arrangements included within the spirit and scope of the appended claims.

What is claimed is:

1. An exhaust gas purifying catalyst comprising:
   a first powder comprising zirconia being formed of porous particles supporting rhodium; and
   a second powder formed of porous particles supporting platinum and a nitrogen oxides-adsorbing material, the nitrogen oxides-absorbing material including at least one element selected from the group consisting of alkaline metals and alkaline earth metals and being free of rare earth metals;
   wherein the first powder and the second powder are present in a mixed state.

2. An exhaust gas purifying catalyst according to claim 1, wherein at least one of the first powder and the second powder supports at least one element selected from the group consisting of cobalt, iron and nickel.

3. An exhaust gas purifying catalyst according to claim 1, further comprising a hydrocarbon-adsorbing adsorbent adjacent to the first powder.

4. An exhaust gas purifying catalyst according to claim 3, wherein the hydrocarbon adsorbing adsorbent is disposed at an interface between the first powder and the second powder.

5. An exhaust gas purifying catalyst according to claim 3, wherein the hydrocarbon adsorbing adsorbent forms a coating layer provided disposed on a monolithic base member, and at least the first powder is supported in the coating layer.

6. An exhaust gas purifying catalyst comprising:
   a base member;
   a coating layer formed on a surface of the base member, the coating layer comprising:
   a first powder comprising zirconia being formed of porous particles supporting rhodium; and
   a second powder comprising porous particles supporting a nitrogen oxides-adsorbing material, the nitrogen oxides-absorbing material including at least one element selected from the group consisting of alkaline metals and alkaline earth metals and being free of rare earth metals;
   wherein the first powder and the second powder are present in a mixed state; and
   platinum supported in the coating layer,
   the concentration of platinum supported in a surface layer portion being higher than the concentration of platinum supported in an internal portion.

7. An exhaust gas purifying catalyst according to claim 6, wherein at least one of the first powder and the second powder supports at least one element selected from the group consisting of cobalt, iron and nickel.

8. An exhaust gas purifying catalyst according to claim 6, further comprising a hydrocarbon-adsorbing adsorbent adjacent to the first powder.

9. An exhaust gas purifying catalyst according to claim 8, wherein the hydrocarbon adsorbing adsorbent is disposed an interface between the first powder and the second powder.

10. An exhaust gas purifying method comprising the steps of:
    disposing, in an exhaust gas passage, a catalyst having a first powder, comprising zirconia being formed of porous particles supporting rhodium, and a second powder formed of porous particles supporting platinum and a nitrogen oxides-adsorbing material, the nitrogen oxides-absorbing material including at least one element selected from the group consisting of alkaline metals and alkaline earth metals and being free of rare earth metals, the first powder and the second powder being present in a mixed state;
    allowing the nitrogen oxides-adsorbing material to adsorb nitrogen oxides in a lean atmosphere in which an excessive amount of oxygen is present; and
    temporarily changing the lean atmosphere to an atmosphere having a stoichiometric to rich air-fuel ratio so as to cause reduction of nitrogen oxides released from the nitrogen oxides-adsorbing material.

11. An exhaust gas purifying catalyst according to claim 10, wherein at least one of the first powder and the second powder supports at lest one element selected from the group consisting of cobalt, iron and nickel.

12. An exhaust gas purifying catalyst according to claim 10, wherein a hydrocarbon-adsorbing adsorbent is provided adjacent to the first powder.

13. An exhaust gas purifying catalyst according to claim 12, wherein the hydrocarbon-adsorbing adsorbent is disposed at an interface between the first powder and the second powder.

* * * * *